US012682517B2

(12) United States Patent
Donini et al.

(10) Patent No.: US 12,682,517 B2
(45) Date of Patent: Jul. 14, 2026

(54) SYSTEMS AND METHODS FOR AUTOMATION PERFORMANCE GRAPHING

(71) Applicant: Deere & Company, Moline, IL (US)

(72) Inventors: Mario L. Donini, Bettendorf, IA (US); Matthew T. Wold, Coal Valley, IL (US); Kent S. Brown, Sherrard, IL (US)

(73) Assignee: Deere & Company, Moline, IL (US)

( * ) Notice: Subject to any disclaimer, the term of this patent is extended or adjusted under 35 U.S.C. 154(b) by 433 days.

(21) Appl. No.: 18/470,546

(22) Filed: Sep. 20, 2023

(65) Prior Publication Data

US 2025/0095242 A1     Mar. 20, 2025

(51) Int. Cl.
| | |
|---|---|
| *A01D 41/127* | (2006.01) |
| *G06T 7/00* | (2017.01) |
| *G06T 11/26* | (2026.01) |

(52) U.S. Cl.
CPC .......... *G06T 11/26* (2026.01); *A01D 41/1277* (2013.01); *G06T 7/0004* (2013.01); *G06T 2200/24* (2013.01); *G06T 2207/30168* (2013.01); *G06T 2207/30188* (2013.01)

(58) Field of Classification Search
CPC .......................... A01D 41/1277; G06T 7/0004
See application file for complete search history.

(56) References Cited

U.S. PATENT DOCUMENTS

| | | |
|---|---|---|
| 4,527,241 A | 7/1985 | Sheehan et al. |
| 4,951,031 A | 8/1990 | Strubbe |

| | | |
|---|---|---|
| 6,029,106 A | 2/2000 | Hale et al. |
| 6,100,526 A | 8/2000 | Mayes |
| 6,119,442 A | 9/2000 | Hale |
| 6,336,051 B1 | 1/2002 | Pangels et al. |
| D631,060 S | 1/2011 | Flik et al. |

(Continued)

FOREIGN PATENT DOCUMENTS

| | | |
|---|---|---|
| CN | 105682446 A | 6/2016 |
| CN | 303932522 S | 11/2016 |

(Continued)

OTHER PUBLICATIONS

U.S. Appl. No. 18/470,544, filed Sep. 20, 2023 Application and Drawings, 74 pages.

(Continued)

*Primary Examiner* — Claude J Brown
(74) *Attorney, Agent, or Firm* — Christopher J. Volkmann; KELLY, HOLT & CHRISTENSON PLLC

(57)     ABSTRACT

A mobile agricultural harvester comprises one or more sensors configured to detect a grain processing quality characteristic and generate sensor data indicative of the detected grain processing quality characteristic, a display screen, one or more processors, memory, and computer executable instructions, stored in the memory, and executable by the one or more processors. The computer executable instructions, when executed by the one or more processors, configuring the one or more processors to generate, on the display screen, an interface comprising a limit interface display element indicative of a limit of the grain processing quality characteristic and a characteristic value interface display element comprising a graph indicative of values of the grain processing quality characteristic over time.

20 Claims, 19 Drawing Sheets

(56) References Cited

U.S. PATENT DOCUMENTS

| | | | |
|---|---|---|---|
| 8,161,718 | B2 | 4/2012 | Bussmann et al. |
| D683,748 | S | 6/2013 | Chutani et al. |
| D730,919 | S | 6/2015 | Jeong et al. |
| D766,300 | S | 9/2016 | Sin et al. |
| D777,756 | S | 1/2017 | Tarud et al. |
| D789,392 | S | 6/2017 | Jaini et al. |
| D793,424 | S | 8/2017 | Bao et al. |
| D803,230 | S | 11/2017 | Jaini et al. |
| D829,234 | S | 9/2018 | Yuguchi et al. |
| D831,059 | S | 10/2018 | Bao |
| D881,204 | S | 4/2020 | Jaini et al. |
| D881,918 | S | 4/2020 | Mizutani et al. |
| D882,584 | S | 4/2020 | Jaini et al. |
| D882,587 | S | 4/2020 | Jaini et al. |
| D923,028 | S | 6/2021 | Perron et al. |
| D946,039 | S | 3/2022 | Borgmann et al. |
| D954,105 | S | 6/2022 | Finch et al. |
| D955,414 | S | 6/2022 | Tompkins et al. |
| D958,167 | S | 7/2022 | Mensinger et al. |
| D977,490 | S | 2/2023 | Casse et al. |
| D984,479 | S | 4/2023 | Williams |
| D997,958 | S | 9/2023 | Feng et al. |
| D999,780 | S | 9/2023 | Stroebel et al. |
| D1,009,065 | S | 12/2023 | Yasuda |
| D1,014,543 | S | 2/2024 | Wang et al. |
| D1,014,547 | S | 2/2024 | Waissman et al. |
| D1,019,675 | S | 3/2024 | Yang |
| D1,029,864 | S | 6/2024 | Jiang |
| D1,030,785 | S | 6/2024 | Tompkins et al. |
| D1,031,756 | S | 6/2024 | Cho et al. |
| D1,031,762 | S | 6/2024 | Tompkins et al. |
| D1,038,139 | S | 8/2024 | Fortunato et al. |
| D1,082,823 | S | 7/2025 | Donini et al. |
| D1,083,987 | S | 7/2025 | Donini et al. |
| D1,084,021 | S | 7/2025 | Donini et al. |
| 2003/0066277 | A1 | 4/2003 | Behnke |
| 2003/0130766 | A1 | 7/2003 | Braunhardt et al. |
| 2003/0216158 | A1 | 11/2003 | Bischoff |
| 2005/0137003 | A1 | 6/2005 | Behnke et al. |
| 2006/0069485 | A1 | 3/2006 | Diekhans |
| 2007/0209423 | A1 | 9/2007 | Missotten et al. |
| 2008/0034720 | A1 | 2/2008 | Helfrich et al. |
| 2009/0088932 | A1 | 4/2009 | Diekhans et al. |
| 2009/0125197 | A1 | 5/2009 | Behnke |
| 2009/0126327 | A1 | 5/2009 | Bussmann et al. |
| 2009/0258684 | A1 | 10/2009 | Missotten et al. |
| 2010/0071329 | A1 | 3/2010 | Hindryckx et al. |
| 2010/0125788 | A1 | 5/2010 | Baumgarten et al. |
| 2010/0217474 | A1 | 8/2010 | Baumgarten et al. |
| 2010/0217481 | A1 | 8/2010 | Baumgarten et al. |
| 2012/0004812 | A1 | 1/2012 | Baumgarten et al. |
| 2014/0050364 | A1 | 2/2014 | Brueckner et al. |
| 2014/0171161 | A1 | 6/2014 | Bischoff |
| 2014/0215984 | A1 | 8/2014 | Bischoff |
| 2014/0236381 | A1 | 8/2014 | Anderson et al. |
| 2014/0358466 | A1 | 12/2014 | Foster et al. |
| 2015/0009328 | A1 | 1/2015 | Escher et al. |
| 2015/0080070 | A1 | 3/2015 | Johnson et al. |
| 2015/0116330 | A1 | 4/2015 | Chiocco et al. |
| 2015/0293507 | A1* | 10/2015 | Burns ................. A01D 41/127 700/83 |
| 2016/0106038 | A1 | 4/2016 | Boyd et al. |
| 2016/0286721 | A1 | 10/2016 | Heitmann et al. |
| 2016/0327535 | A1 | 11/2016 | Cotton et al. |
| 2016/0345485 | A1 | 12/2016 | Acheson et al. |
| 2017/0032473 | A1 | 2/2017 | Koch et al. |
| 2017/0049045 | A1 | 2/2017 | Wilken et al. |
| 2017/0071125 | A1 | 3/2017 | Pfeiffer et al. |
| 2017/0083035 | A1 | 3/2017 | French |
| 2017/0160916 | A1 | 6/2017 | Baumgarten et al. |
| 2017/0251600 | A1 | 9/2017 | Anderson et al. |
| 2018/0108123 | A1 | 4/2018 | Baurer et al. |
| 2018/0359917 | A1 | 12/2018 | Blank et al. |
| 2018/0359919 | A1 | 12/2018 | Blank et al. |
| 2019/0059222 | A1 | 2/2019 | Kelber |
| 2019/0084855 | A1* | 3/2019 | Tirman ...................... C02F 9/00 |
| 2019/0090423 | A1 | 3/2019 | Escher et al. |
| 2019/0166760 | A1 | 6/2019 | Palla et al. |
| 2019/0183045 | A1 | 6/2019 | Rademacher |
| 2019/0223375 | A1 | 7/2019 | Missotten et al. |
| 2019/0274254 | A1 | 9/2019 | Banks, Jr. et al. |
| 2019/0354081 | A1 | 11/2019 | Blank et al. |
| 2020/0008351 | A1 | 1/2020 | Zielke et al. |
| 2020/0015416 | A1 | 1/2020 | Barther et al. |
| 2020/0019777 | A1 | 1/2020 | Gurzoni et al. |
| 2020/0128734 | A1 | 4/2020 | Brammeier et al. |
| 2020/0221635 | A1 | 7/2020 | Hendrickson et al. |
| 2020/0245557 | A1 | 8/2020 | Reinecke |
| 2020/0296892 | A1 | 9/2020 | Donini et al. |
| 2020/0326674 | A1 | 10/2020 | Palla et al. |
| 2021/0015039 | A1 | 1/2021 | Vandike et al. |
| 2021/0059117 | A1 | 3/2021 | Hunt |
| 2021/0088691 | A1 | 3/2021 | Ferren et al. |
| 2021/0105941 | A1 | 4/2021 | Yu et al. |
| 2021/0127544 | A1 | 5/2021 | Ohrstrom et al. |
| 2021/0209490 | A1 | 7/2021 | Casas et al. |
| 2021/0264252 | A1 | 8/2021 | Davis |
| 2021/0337729 | A1 | 11/2021 | O'Connor et al. |
| 2021/0378176 | A1 | 12/2021 | Leenknegt et al. |
| 2022/0026230 | A1 | 1/2022 | Sidon et al. |
| 2022/0061215 | A1 | 3/2022 | Heitmann et al. |
| 2022/0084191 | A1 | 3/2022 | Fischer et al. |
| 2022/0110238 | A1 | 4/2022 | Vandike et al. |
| 2022/0110246 | A1 | 4/2022 | Vandike et al. |
| 2022/0110253 | A1 | 4/2022 | Anderson et al. |
| 2022/0110262 | A1 | 4/2022 | Vandike et al. |
| 2022/0113727 | A1 | 4/2022 | Vandike et al. |
| 2022/0132736 | A1 | 5/2022 | Meyers et al. |
| 2022/0132737 | A1 | 5/2022 | Anderson et al. |
| 2022/0176818 | A1 | 6/2022 | Piscopo et al. |
| 2024/0130281 | A1 | 4/2024 | Maney et al. |

FOREIGN PATENT DOCUMENTS

| | | | |
|---|---|---|---|
| CN | 306078929 | S | 9/2020 |
| CN | 306284781 | S | 1/2021 |
| CN | 307326255 | S | 5/2022 |
| CN | 307690307 | S | 11/2022 |
| DE | 102021117470 | A1 | 1/2022 |
| EP | 1674324 | A1 | 6/2006 |
| EP | 1674324 | 81 | 4/2008 |
| EP | 2570968 | A2 | 3/2013 |
| EP | 2057882 | B2 | 10/2014 |
| EP | 3466238 | A1 | 4/2019 |
| EP | 3818803 | A1 | 5/2021 |
| EP | 4183443 | A1 * | 5/2023 ......... A61N 1/37247 |
| GB | 1450956 | A | 9/1976 |
| GB | 2144861 | A | 3/1985 |
| RU | 2644953 | C2 | 2/2018 |
| WO | 2015049847 | A1 | 4/2015 |
| WO | 2021116802 | A1 | 6/2021 |

OTHER PUBLICATIONS

U.S. Appl. No. 18/470,544 Notice of Third Party Submission under 37 CFR 1.290 Concise Description of Relevance dated Jun. 18, 2025, 2 pages.

Non-Final Office Action dated Nov. 6, 2024, issued in U.S. Appl. No. 29/912,529, 104 pages.

Non-Final Office Action dated Nov. 6, 2024, issued in U.S. Appl. No. 29/912,524, 93 pages.

Non-Final Office Action dated Nov. 6, 2024, issued in U.S. Appl. No. 29/912,527, 93 pages.

Agriculture AI Automation, www.dribbble.com, By Sam Halpert, retrieved Oct. 22, 2024, posted online Sep. 19, 2023. Retrieved from <URL: https://dribbble.com/shots/22598642-Agriculture-AI-Automation-WebApp>, 2 pages.

Farm management Dashboard, www.dribbble.com, By FrenchApp &Web, retrieved Oct. 22, 2024, posted online Feb. 9, 2021. Retrieved from <URL: https://dribbble.com/shots/15093384-Farm-management-dashboard>, 2 pages.

(56) References Cited

OTHER PUBLICATIONS

Smart Agriculture Dashboard, www.dribbble.com, By Halley, retrieved Oct. 22, 2024, posted online Feb. 27, 2020. Retrieved from <URL: https://dribbble.com/shots/10484917-Smart-agriculture-Dashboard>, 2 pages.

Screen captures from YouTube video clip entitled "AFS Harvest Command Combine Automation Extended Version," CASE IH North America, 4 pages, uploaded on Nov. 2, 2018. Retrieved from Internet: <https://youtube/yBLsO5_KwYA>.

UI UX Design Concept for Agriculture Web Platform, www.dribbble.com, by Maria Zmitrovich, retrieved Oct. 22, 2024, posted online Dec. 2, 2021. Retrieved from <URL: https://dribbble.com/shots/16980879-UI-UX-Design-Concept-for-Agriculture-Web-Platform>, 2 pages.

* cited by examiner

FIG. 4

INTERFACE 448-1

CHARACTERISTIC PORTION 502

CHARACTERISTIC VALUE INTERFACE DISPLAY ELEMENT(S) 505

LIMIT INTERFACE DISPLAY ELEMENT(S) 507

LIMIT ADJUSTER INTERFACE DISPLAY ELEMENT(S) 509

INFORMATION INTERFACE DISPLAY ELEMENT(S) 511

OTHER 512

1300

SENSOR DATA 1306

OUTPUT(S) FROM CONTROL DETERMINATION SYSTEM 1308

USER/OPERATOR INPUT(S) 1310

DATA FROM DATA STORE(S) 1312

OTHER 1314

START

A

OBTAIN DATA 1304

GENERATE INTERFACE(S) BASED, ON OBTAINED DATA 1316

CONTROL INTERFACE MECHANISM(S) TO DISPLAY GENERATED INTERFACE(S) 1318

OPERATION COMPLETE? 1320

NO

YES

END

SYSTEMS AND METHODS FOR AUTOMATION PERFORMANCE GRAPHING

FIELD OF THE DESCRIPTION

The present descriptions relate to mobile agricultural machines, particularly mobile agricultural harvesting machines configured to harvest at a field.

BACKGROUND

There are a wide variety of different mobile agricultural machines. One such mobile agricultural machine is a mobile agricultural harvesting machine. The mobile agricultural harvesting machine can include a header that engages, gathers, and cuts crop at the field. The header further directs the cut crop material towards crop material processing functionality such that grain can be separated from material other than grain.

The discussion above is merely provided for general background information and is not intended to be used as an aid in determining the scope of the claimed subject matter.

SUMMARY

A mobile agricultural harvester comprises one or more sensors configured to detect a grain processing quality characteristic and generate sensor data indicative of the detected grain processing quality characteristic, a display screen, one or more processors, memory, and computer executable instructions, stored in the memory, and executable by the one or more processors. The computer executable instructions, when executed by the one or more processors, configuring the one or more processors to generate an interface comprising a limit interface display element indicative of a limit of the grain processing quality characteristic and a characteristic value interface display element comprising a graph indicative of values of the grain processing quality characteristic over time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4 is a block diagram showing one example of an interface generator.

DETAILED DESCRIPTION

Figure 1:
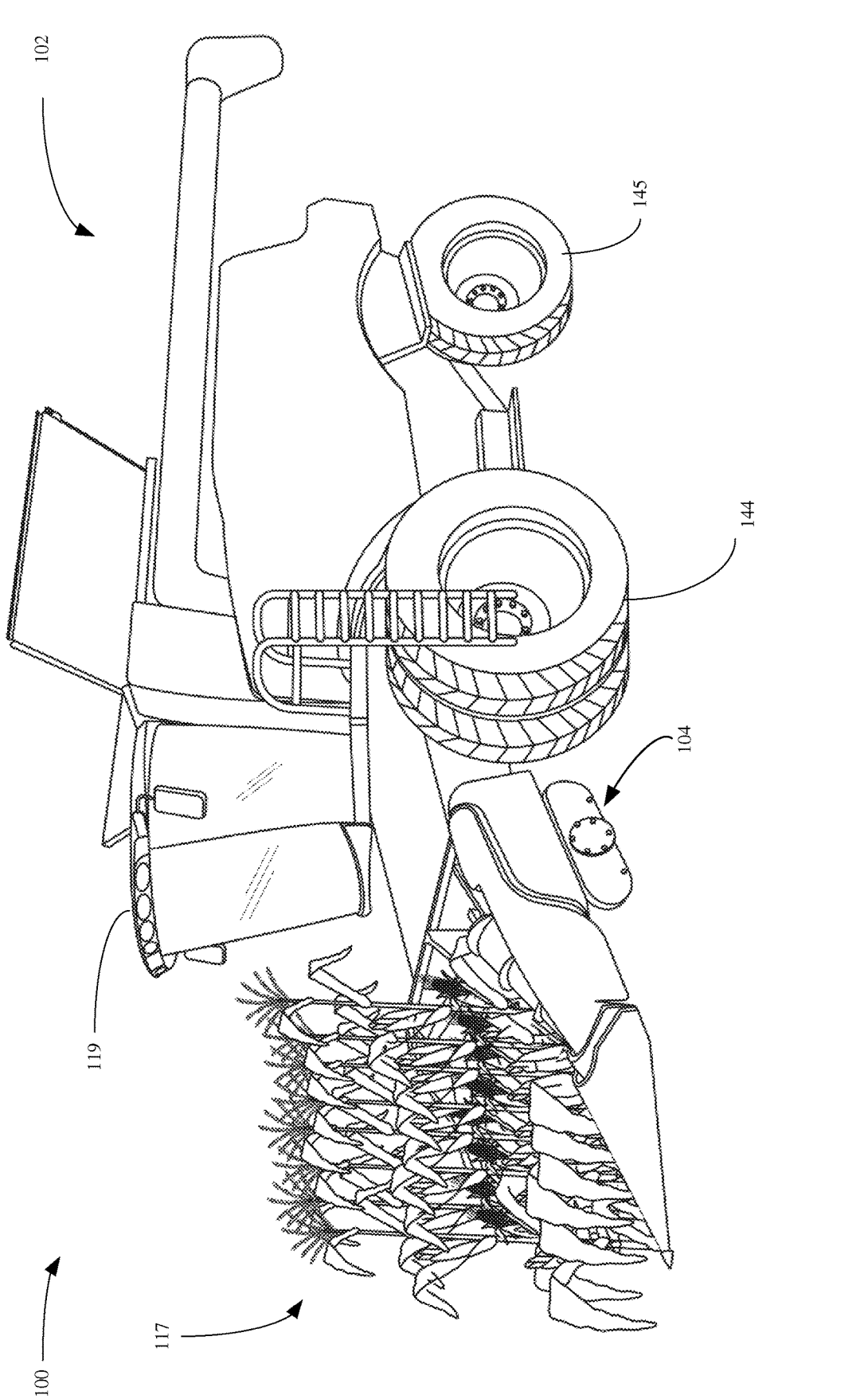
FIG. 1 illustrates one example of a mobile agricultural harvesting machine.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

Mobile agricultural machines perform agricultural operations at agricultural worksites (e.g., fields). The mobile agricultural machines may be outfitted with one or more sensors that detect values of characteristics as the agricultural machines are operating. The detected values of characteristics may be used to control the mobile agricultural machines as they operate, for instance, a limit value, or threshold value, for each characteristic may be used and where the detected value of the characteristic does not satisfy the corresponding limit (or threshold) value, adjustment of the machine may occur.

One example of a mobile agricultural machine is a mobile agricultural harvesting machine. A mobile agricultural harvesting machine, such as combine harvester, can include a header, such as a corn header, a draper header (including a reel), as well as other forms of headers. The mobile agricultural harvesting machine travels across a field and the header engages, gathers, and cuts the crop. The header then propels the cut crop material towards crop processing functionality further back in the machine where the crop processing functionality separates the grain from material other than grain (MOG), deposits the grain in an on-board grain tank and expels the MOG from the machine. Often, and due to a one or more of a variety of reasons, grain and MOG are not perfectly separated such that MOG will accompany grain in the on-board grain tank, thus resulting in poorer quality grain. Grain cleanliness is a factor that contributes to the eventual selling price of the grain. The sale price can, and often is reduced when the grain is dirty, or includes at least a threshold level of MOG. Additionally, or alternatively, grain may accompany MOG and be expelled from the harvester, thus resulting in grain loss. Other forms of grain loss can also occur, such as grain loss at the header due to a variety of factors. Grain loss reduced the total amount of saleable grain and thus, reduced the total amount of revenue. Additionally, or alternatively, grain can be broken during the harvesting process, including during the separation process. Broken grain is often considered as being of lesser quality. The level (or amount) of broken grain contributes to the eventual selling price of the grain. The sale price can, and often is reduced when grain is broken, or is at least broken to a threshold level.

In some current systems operators or users, or both, may set a limit for various grain processing quality characteristics, such as grain cleanliness, grain loss, and grain brokenness. These limit(s), along with sensor feedback, are then used to control one or more operating parameters of the harvesting machine. However, operators and users have struggled with current systems to set satisfactory limits. For instance, some current systems may not show how the value of each grain processing quality characteristic has varied over time during the operation, such as to provide context for the current value. Additionally, some current systems may not display the limit in relation to detected value(s) in a way that can be quickly and easily understood by the operators or users. Additionally, some current systems may not provide an operator or user friendly functionality for adjusting limit values or other aspects of the system. Additionally, some current system may not show the grain processing quality characteristic limit(s) and the values of the grain processing quality characteristic(s) along with values of other performance characteristics of the harvester, such as productivity characteristics (e.g., harvest rate, yield, etc.) such that a user or operator can see how, simultaneously, how grain processing quality characteristic performance relates to other performance characteristics of the harvester. It will be understood that limit, as used herein, can refer to a threshold or max acceptable (or max desirable) level of a given characteristic (e.g., a given grain processing quality characteristic) and thus, a limit can be a threshold value or a max acceptable (or max desirable) value.

Disclosed herein is a system that generates an interface and controls an interface mechanism to display the generated interface. The interface includes a characteristic display portion that displays a current value of each of one or more characteristics (e.g., grain processing quality characteristics) as well as historical values of each of the one or more characteristics (e.g., grain processing quality characteristics). The characteristic display portion further displays a current limit value of each of the one or more characteristics (e.g., grain processing quality characteristics) and provides functionality for adjustment, by a user or operator, or both, of each of the one or more limit values. In some examples, the functionality includes one or more interactable interface display elements, interaction with which causes the generation of a limit adjustment interface, as an overlay or separately, which includes interactable display elements, interaction with which adjusts a corresponding limit value. In addition, in some examples, the interface can further include a performance display portion that shows a current value of each of one or more other performance characteristics (e.g., harvest rate, yield, etc.) as well as historical values of each of the one or more other performance characteristics. In addition, in some examples, the interface can include various other items, some of which are described in more detail herein.

While examples herein are described with reference to a particular example mobile agricultural machine in the form of a mobile agricultural harvester, it will be understood that the systems and methods described herein are applicable to other types of mobile agricultural machines, such as mobile agricultural planting machines, mobile agricultural tillage machines, and mobile agricultural spraying machines.

FIG. 1 is a perspective view that illustrates a mobile agricultural harvesting machine (or harvester) 100. Harvester 100 is illustratively shown as a self-propelled combine harvester 102 that includes a header 104. Header 104 engages, gathers, and cuts crop 117 at a field as the harvester travels over the field. While the example shown in FIG. 1, illustrates a corn header that engages, gathers, and cuts corn plants at a field as the harvester 100 travels over the field, in other examples, a mobile agricultural harvesting machine 100 can include a variety of different types of headers, such as a reel-type or draper header that engages, gathers, and cuts crop plants other than corn.

Harvester 100 further includes a set of ground engaging traction elements, such as front wheels 144 and rear wheels 145. In other examples, one or both of the front wheels 144 and rear wheels 145 can comprise other types of ground engaging traction elements, such as tracks. In some examples, one of the front wheels 144 and rear wheels 145 are used to steer while the other are driven by a propulsion subsystem to propel the harvester 100 across a field at which the harvester 100 operates. In the example illustrated, harvester 100 includes an operator compartment or cab 119, which can include a variety of different operator interface mechanisms (e.g., 318 shown in FIG. 3) for controlling harvester 100 as well as for displaying various information.

Figure 2:
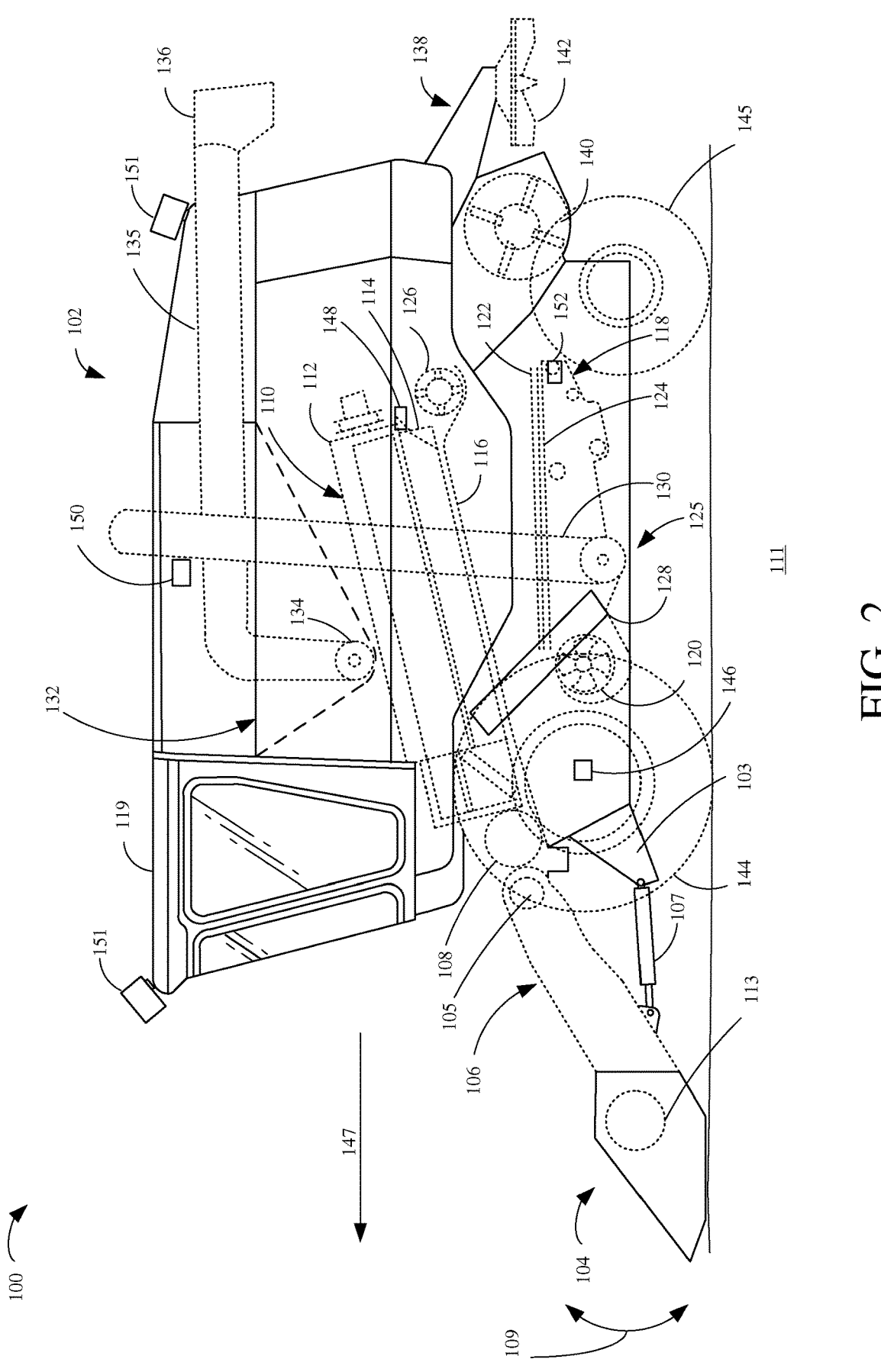
FIG. 2 is a partial pictorial, partial schematic illustration of one example of a mobile agricultural harvesting machine.

FIG. 2 is a partial pictorial, partial schematic, illustration of agricultural harvester 100. Some items in FIG. 2 are similar to items shown in FIG. 1 and thus are numbered similarly. As illustrated in FIG. 2, harvester 100 includes a feeder house 106, a feed accelerator 108, and a thresher generally indicated at 110. The feeder house 106 and the feed accelerator 108 form part of a material handling subsystem 125. Header 104 is pivotally coupled to a frame 103 of non-header portion 102 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 1, agricultural harvester 100 may also include one or more actuators that operate to apply a tilt angle, a roll angle, or both to the header 104 or portions of header 104.

Agricultural harvester 100 includes a material handling subsystem 125 that includes a thresher 110 which illustratively includes a threshing rotor 112 and a set of concaves 114. Further, material handling subsystem 125 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, and clean grain elevator 130. The clean grain elevator moves clean grain into clean grain tank 132.

Harvester 100 also includes a material transfer subsystem that includes a conveying mechanism 134, a chute 135, and a spout 136. Conveying mechanism 134 can be a variety of different types of conveying mechanisms, such as an auger or blower. Conveying mechanism 134 is in communication with clean grain tank 132 and is driven to convey material from grain tank 132 through chute 135 and spout 136. Chute 135 is rotatable through a range of positions from a storage position (shown in FIG. 2) to a variety of positions away from agricultural harvester 100 to align spout 136 relative to a material receptacle (e.g., grain cart, towed trailer, etc.) that is configured to receive the material within grain tank 132. Spout 136, in some examples, is also rotatable to adjust the direction of the crop stream exiting spout 136.

Harvester 100 also includes a residue subsystem 138 that can include chopper 140 and spreader 142. Harvester 100 also includes a propulsion subsystem that includes an engine (or other form of power plant) that drives ground engaging traction components, such as 144 or 144 and 145 to propel the harvester 100 across a worksite such as a field (e.g., ground 111). In some examples, a harvester within the scope of the present disclosure may have more than one of any of the subsystems mentioned above. In some examples, harvester 100 may have left and right cleaning subsystems, separators, etc., which are not shown in FIG. 2.

In operation, and by way of overview, harvester 100 illustratively moves through a field 111 in the direction indicated by arrow 147. As harvester 100 moves, header 104 engages the crop plants to be harvested and cuts (with a cutter bar on the header 104, not shown in FIG. 2) the crop plants to generate cup crop material.

The cut crop material is engaged by a cross auger 113 which conveys the separated crop material to a center of the header 104 where the severed crop material is then moved through a conveyor in feeder house 106 toward feed accelerator 108, which accelerates the separated crop material into thresher 110. The separated crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow.

Grain falls to cleaning subsystem 118. Chaffer 122 separates some larger pieces of MOG from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

Harvester 100 can include a variety of sensors, some of which are illustrated in FIG. 2, such as ground speed sensor 146, one or more separator loss sensors 148, one or more grain cameras 150, one or more loss sensors 152 provided in the cleaning subsystem 118, and an observation sensor systems 151, which may include, one or more of one or more imaging systems (e.g., mono or stereo cameras), optical sensors, lidar, radar, ultrasonic sensors, thermal or infrared sensors, as well as various other sensors, such as sensors that emit and/or received electromagnetic radiation.

Ground speed sensor 146 senses the travel speed of harvester 100 over the ground. Ground speed sensor 146 may sense the travel speed of the harvester 100 by sensing the speed of rotation of the ground engaging traction elements (such as wheels or tracks), a drive shaft, an axle, or other components. In some instances, the travel speed may be sensed using a positioning system, such as a global positioning system (GPS), a dead reckoning system, a long range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when harvester 100 is on a slope, the orientation of harvester 100 relative to the slope is known. For example, an orientation of harvester 100 could include ascending, descending or transversely travelling the slope.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 2. The separator loss sensors 148 may be associated with the left and right separators and may provide separate grain loss signals or a combined or aggregate signal. In some instances, sensing grain loss in the separators may also be performed using a wide variety of different types of sensors as well.

Grain cameras 150 illustratively observe grain. A grain camera 150 may detect various characteristics, such as the cleanliness of the grain. For example, a grain camera 150 may detect an amount of MOG (also sometimes referred to as foreign material) comingled with the grain. Additionally, a grain camera 150 may detect brokenness of the grain. For example, a grain camera 150 may detect an amount of broken grain. Additionally, grain camera 150 may detect grain loss. For example, grain camera 150 may detect an amount of grain that is lost (e.g., not gathered into grain tank 132). Grain camera 150 may detect various other characteristics. In one example, a grain camera 150 is disposed in a bypass, coupled to grain elevator 130, through which at least some grain is directed and observed by grain camera 150. In some examples, a grain camera 150 may be part of observation sensor system 150 and may be disposed to observe a grain processing quality characteristic, such as grain loss, at the front of the harvester 100 (e.g., header grain loss) or at the back of harvester 100 (e.g., grain comingled with residue and being conveyed out of the back of harvester 100). These are merely some examples. In other examples, a grain camera 150 can be disposed at various locations and can be disposed to observe grain in various other locations.

Observation sensor systems 151 are disposed to observe various characteristics at the worksite. For example, observation sensor systems 151 may detect characteristics around harvester 100 as well as characteristics on harvester 100 (e.g., characteristics on header 104). For example, one observation sensor system 151 may be disposed to detect characteristics occurring at or on header 104, such as grain loss, MOG intake, stalk diameter, car size, as well as various other characteristics. Another observation sensor system 151 may be disposed to view rearwardly of the harvester 100 to detect various characteristics such as the amount of residue as well as grain loss (an amount of grain being output with the residue). These are merely some examples. Observation sensor systems 151 may comprise or may include one or a combination of camera(s) (e.g., mono or stereo camera(s), etc.), Lidar, Radar, Ultrasonic sensors, as well as various other sensors that are configured to emit and/or receive electromagnetic radiation.

Harvester 100 can include various other sensors, some of which will be discussed below.

Figure 3:
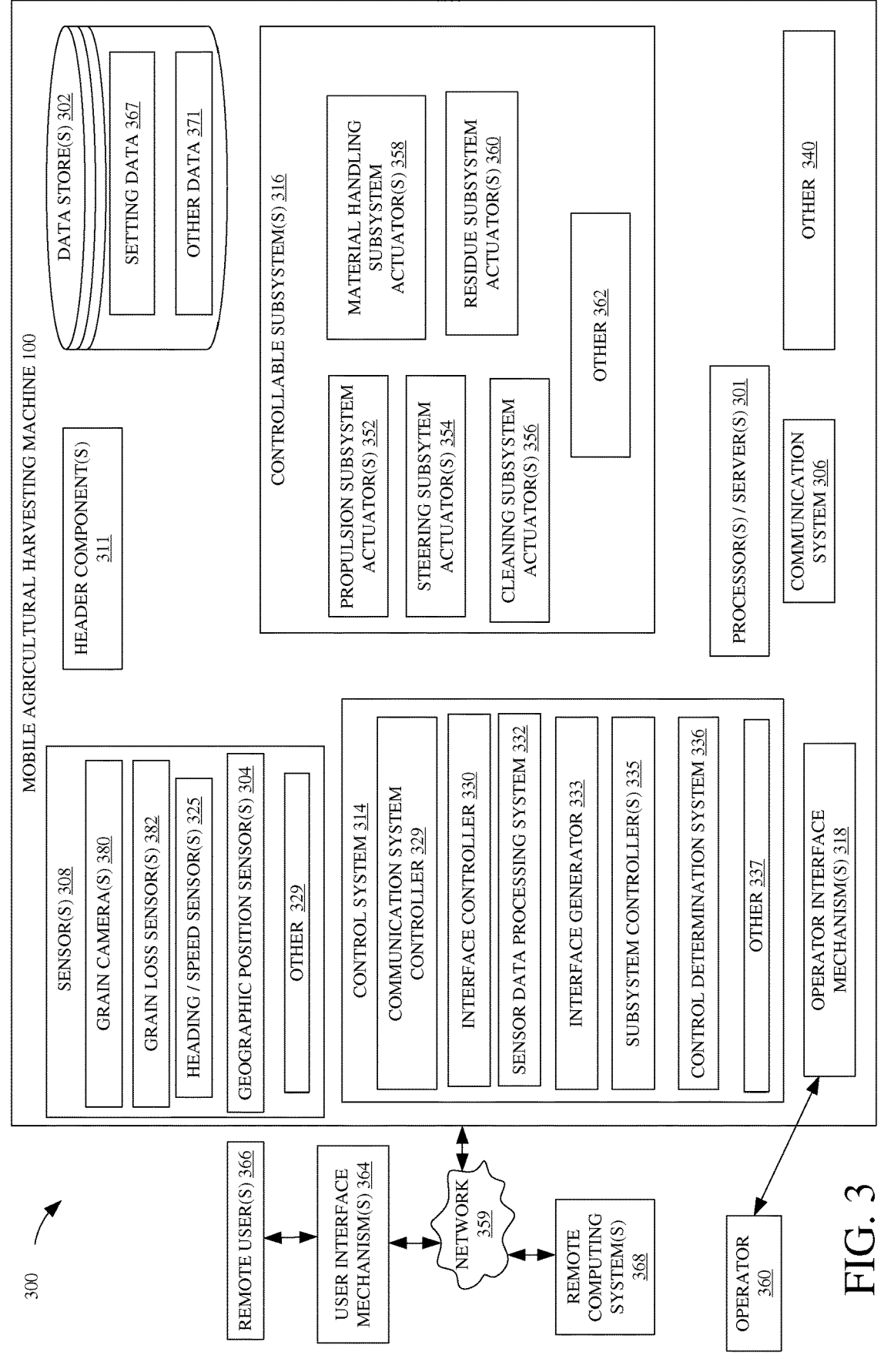
FIG. 3 is a block diagram showing some portions of an agricultural corn harvesting system, including a mobile agricultural harvesting machine, in more detail, according to some examples of the present disclosure.

FIG. 3 is a block diagram showing some portions of an agricultural harvesting system architecture 300 (herein also referred to as "agricultural system" or "agricultural harvesting system"). FIG. 3 shows that agricultural system 300 includes mobile agricultural harvesting machine 100 (also referred to herein as harvester 100 or mobile machine 100), one or more remote computing systems 368, and one or more remote user interfaces 364. Harvester 100, itself, illustratively includes one or more processors or servers 301, one or more data stores 302, communication system 306, and one or more sensors 308 that sense one or more characteristics at a worksite (e.g., a field). Harvester 100 also includes header component(s) 311, control system 314, one or more controllable subsystems 316, and operator interface mechanisms 318. Harvester 100 can also include a wide variety of other items and functionality 340, some of which is described elsewhere herein.

Data stores 302 store a variety of data. For example, data stores 302 can include, among other things, setting data 367 as well as various other data 371, some of which will be described below. Other data 371 can include, for example, computer executable instructions, executable by the one or more processors or servers 302, that, when executed by the one or more processors or servers 302, configure the one or more processors or servers 302 to implement or provide various other components or functionalities of harvester 100 described herein. It will be understood that data stores 302 can include different forms of data stores, for instance, one or more of volatile data stores (e.g., Random Access Memory (RAM)) and non-volatile data stores (e.g., Read Only Memory (ROM), hard drives, solid state drives, etc.). Other data 371 can also include various other data such as data indicative of various characteristics of the field at which mobile agricultural harvesting machine 100 is operating (e.g., historical performance data relative to the particular field, etc.), characteristic of the crop at the field such as crop type or other characteristics of the crop, characteristics of the particular harvester 100 (e.g., historical performance data, operating ranges, model of the harvester, power ratings, etc.), as well as various other information, including information provided by an operator or user or data provided in other ways.

Sensors 308 detect characteristics at a worksite during the course of an operation and generate sensor data indicative of the characteristics (e.g., sensor data indicative of characteristic values). Sensors 308 illustratively include one or more grain cameras 380, one or more grain loss sensors 382, one or more heading/speed sensors 325, one or more geographic position sensors 304, and can include various other sensors 329.

Grain cameras 380 captures image(s) (e.g., still images or video) of grain gathered or encountered by harvester 100. The image(s) are indicative of one or more grain processing quality characteristics, such as the cleanliness of the grain, the brokenness of the grain, grain loss, as well as a variety of other characteristics. Thus, grain cameras 380 detect various grain processing quality characteristics. Grain cameras 380 can be similar to grain camera 150 shown in FIG. 2 or can be a variety of other cameras. It will be understood that in some examples, cleanliness of grain or grain cleanliness is also referred to as clean grain or foreign material and that brokenness of grain or grain brokenness is also referred to as broken grain.

Grain loss sensors 382 detect grain loss during the operation. Grain loss sensors can detect grain loss within or without the harvester 100. For example, grain loss sensors 382 can include a camera or other imaging device that detects grain loss outside of the harvester 100, such as at header 104 (e.g., butt shelling, grain tossed from header 104, etc.), out of the rear of harvester 100 (e.g., grain in the residue expelled from the harvester 100), as well as observing missed crop plants behind the header 104 (or behind the harvester 100). Thus, grain loss sensors 382 can include, or be similar to, observation sensor systems 151. Additionally, or alternatively, grain loss sensors 382 can include sensors that detect grain loss within the harvester 100, such as grain loss occurring at or due to the separator 116 or grain loss occurring at or due to the cleaning subsystem 118, or both. Thus, grain loss sensors 382 can include, or be similar to, separator loss sensors 148 or loss sensors 152, or both.

Geographic position sensors 304 illustratively sense or detect the geographic position or location of harvester 100. Geographic position sensors 304 can include, but are not limited to, a global navigation satellite system (GNSS) receiver that receives signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors. In some examples, the geographic position or location detected by geographic position sensors 304 can be processed to derive a geographic position or location of a given component of harvester 100. The dimensions of the mobile machine, such as the distance of certain components from the geographic position sensors 304, which can be stored in data store 302 (e.g., part of other data 371) or otherwise provided, can be used, in combination with detected geographic position or location, to derive the geographic position or location of the component. This processing can be implemented by processors or servers 302.

Heading/speed sensors 325 detect a heading and speed at which harvester 100 is traversing the worksite during the operation. This can include sensors that sense the movement of ground engaging traction elements (e.g., 144 or 145, or both) or can utilize signals received from other sources, such as geographic position sensor 304. Thus, while heading/speed sensors 325 as described herein are shown as separate from geographic position sensor 304, in some examples, machine heading/speed is derived from signals received from geographic positions sensors 304 and subsequent processing. In other examples, heading/speed sensors 325 are separate sensors and do not utilize signals received from other sources.

Other sensors 327 may be any of a variety of other types of sensors, including some of the sensors previously described herein.

FIG. 3 shows that an operator 360 may operate harvester 100. The operator 360 interacts with operator interface mechanisms 318. The operator 360 may be local to harvester 100 or may be remote from harvester 100. In some examples, operator interface mechanisms 318 may include joysticks, levers, a steering wheel, linkages, pedals, buttons, key fobs, wireless devices, such as mobile computing devices, dials, keypads, a display device with actuatable interface display elements (such as icons, buttons, etc.), a microphone and speaker (where speech recognition and speech synthesis are provided), among a wide variety of other types of control devices. Where a display device with a touch sensitive screen is provided, as an operator interface mechanism 318, operator 360 may interact with operator interface mechanisms 318 using touch gestures. These examples described above are provided as illustrative examples and are not intended to limit the scope of the present disclosure. Consequently, other types of operator interface mechanisms 318 may be used and are within the scope of the present disclosure.

FIG. 3 also shows one or more remote users 366 interacting with harvester 100 or remote computing systems 368, or both, through user interface mechanisms 364 over network 359. User interface mechanisms 364 can include joysticks, levers, a steering wheel, linkages, pedals, buttons, key fobs, wireless devices, such as mobile computing devices, dials, keypads, a display device with actuatable interface display elements (such as icons, buttons, etc.), a microphone and speaker (where speech recognition and speech synthesis are provided), among a wide variety of other types of control devices. Where a display device with a touch sensitive screen is provided, as a user interface mechanism 364, a user 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, harvester 100 can be controlled remotely by remote computing systems 368 or by remote users 366, or both. As will be described below, in some examples, one or more of the components shown being disposed on harvester 100 in FIG. 3 can be located elsewhere, such as at remote computing systems 368 and/or user interface mechanisms 364.

FIG. 3 also shows that harvester 100 includes a control system 314 and one or more controllable subsystems 316. Control system 314 includes communication system controller 329, interface controller 330, sensor data processing system 332, interface generator 333, one or more subsystem controllers 335, control determination system 336, and can include other items 337. Controllable subsystems 316 can include one or more propulsion subsystem actuators 352, one or more steering subsystem actuators 354, one or more cleaning subsystem actuators 356, one or more material handling subsystem actuators 358, one or more residue subsystem actuators 360, and can include other items 362.

In some examples, communication system controller 329 controls communication system 306 to communicate with various other items of agricultural system 300 such as to send and receive various items.

Interface controller 330 is operable to generate control signals to control interface mechanisms, such as operator interface mechanisms 318 or user interface mechanisms 364, or both, to generate (e.g., display) interfaces generated by interface generator 333. Interface generator 333 will be described in more detail below.

Sensor data processing system 332 is configured to process sensor data (e.g., images, signals, etc.) generated by sensors 308 and to generate processed sensor data. The processed sensor data can be indicative of values of one or more characteristics detected by sensors 308. For example, processed sensor data can be indicative of values of characteristics of grain detected by grain cameras 380, for example, grain cleanliness values or grain brokenness values, or both. Additionally, processed sensor data can be indicative of values of characteristic of grain detected by gain loss sensors 382, for example grain loss values, which can include grain loss values attributed to area or process, such as separator grain loss, cleaning subsystem grain loss, header grain loss, residue grain loss, as well as various other areas or processes. Additionally, processed sensor data can be indicative of values of various other characteristics detected by sensors 308 such as heading values or speed values, or both, based on sensor data generated by heading/speed sensors 325, geographic position values based on sensor data generated by geographic position sensors 304, as well as various other characteristic values based on sensor data generated by other sensors 329.

Sensor data processing system 332 can include or utilize various processing functionalities, including, but not limited to, filtering, categorization, aggregation, normalization, analog-to-digital conversion, as well as various other functionalities. Additionally, sensor data processing system 332 can include or utilize various image processing functionalities such as sequential image comparison, color extraction (e.g., RGB color extraction, etc.), edge detection, black/white analysis, pixel testing, pixel clustering, shape detection, as well as any number of other suitable image processing functionalities. Additionally, sensor data processing system 332 can include or utilize various machine learning functionalities or various artificial intelligence functionalities, or both.

Subsystem controllers 335 are operable to generate control signals to control one or more controllable subsystems 316. For example, subsystem controllers 335 can generate control signals to control one or more controllable subsystems 316 based on operating parameters output by control determination system 336. Control determination system 336 will be described in more detail below.

Propulsion subsystem actuators 352 include actuators that are controllable to adjust a travel speed of harvester 100. Propulsion subsystem actuators 352 can include an engine, motor(s), pump(s), as well as variety of other actuators, that are operable to adjust movement (e.g., adjust speed of rotation) of ground engaging traction elements (e.g., 144 or 145).

Steering subsystem actuators 350 include actuators that are controllable to adjust a heading of harvester 100. Steering subsystem actuators 354 can include hydraulic or electrical actuators that are operable to adjust the orientation (steering or turning angle) of ground engaging traction elements (e.g., 144 or 145).

Cleaning subsystem actuators 350 include actuators that are controllable to adjust a position or a speed of various components of cleaning subsystem 118, such as a position or speed of cleaning fan 120, a position (e.g., to control the size of openings) of chaffer 122 or of sieve 124, or both. Cleaning subsystem actuators 350 can include hydraulic, electrical, or pneumatic actuators.

Material handling subsystem actuators 358 include actuators that are controllable to adjust a position or a speed of various components of material handling subsystem 125, such as the speed of threshing rotor 112 or a position of concave(s) 114 to control a spacing between the concave(s) 114 and the threshing rotor 112 (sometimes referred to a concave clearance), the speed of the discharge beater 126, the speed of the tailings elevator 128, or the speed of the clean grain elevator 130. Material handling subsystem actuators 358 can include hydraulic, electrical, or pneumatic actuators.

Residue subsystem actuators 360 include actuators that are controllable to adjust a position or a speed of various components of residue subsystem 138, such as the position or speed of chopper 140 or the position or speed of spreader 142. Residue subsystem actuators 360 can include hydraulic, electrical, or pneumatic actuators.

Harvester 100 can include a variety of other controllable subsystems 362.

While the illustrated example of FIG. 3 shows that various components of agricultural system 300 are located on harvester 100, it will be understood that in other examples one or more of the components illustrated on harvester 100 in FIG. 3 can be located at other locations, such as one or more remote computing systems 368 or remote user interface mechanisms 364. For instance, one or more of data stores 302 (or one or more components thereof), interface generator 333 (or one or more components thereof), and control determination system 336 (or one or more components thereof) can be located remotely from harvester 100 but can communicate with harvester 100 via communication system 306 and network 359. Similarly, information generated by the harvester 100 (e.g., sensor data generated by sensors 308) may be provided to the remote locations over network 359.

In some examples, control system 314 (or one or more components thereof) can be located remotely from harvester 100 such as at one or more of remote computing systems 368 and remote user interface mechanisms 364. In other examples, a remote location, such as remote computing systems 368 or user interface mechanisms 364, or both, may include a respective control system which generates control values that can be communicated to harvester 100 and used by on-board control system 314 to control the operation of harvester 100. These are merely examples.

It will be noted that network 359 can comprise one or more of a cellular network, a wide area network, a local area network, a near field communication network, or any of a variety of other networks or combinations of networks.

Figure 4:
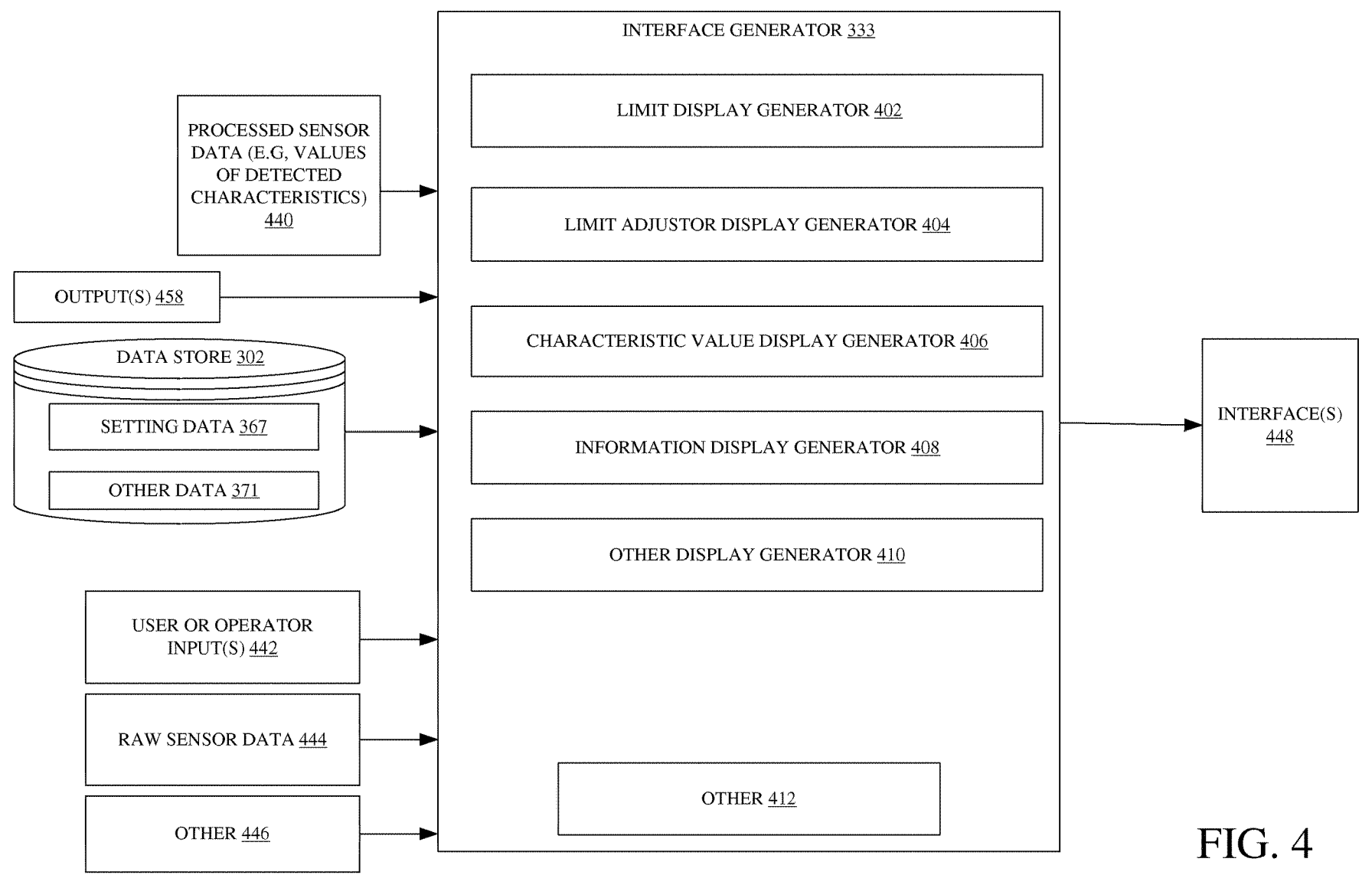

FIG. 4 is a block diagram of a portion of the agricultural harvesting system architecture 300 shown in FIG. 3. Particularly, FIG. 4 shows, among other things, examples of the interface generator 333 in more detail. As illustrated in FIG. 4, interface generator 333 includes limit display generator 402, limit adjustor display generator 404, characteristic value display generator 406, information display generator 410, other display generator 412, and can include other items 413 as well.

As a general overview, interface generator 333 obtains (e.g., receives or retrieves) various data, such as processed sensor data 440 generated by sensor data processing system 332, user or operator inputs 442 received through an interface mechanism (e.g., 418 or 364, etc.), raw sensor data 444 generated by sensors 308, data from data stores 302, outputs 458 generated by control determination system 336 (described in FIG. 5), as well as various other data 446. Interface generator 333 then generates, as output(s), one or more interfaces 448 based on one or more of the obtained data.

Limit display generator 402 generates an interface 448, or a portion of an interface 448, that includes one or more limit interface display elements that each display a limit corresponding to a particular characteristic, for example, a grain loss limit interface display element, a grain brokenness limit interface display element, a grain cleanliness limit interface display element, as well as limit interface display elements for various other characteristics. In some examples, limit display generator 402 generates the one or more limit interface display elements based on operator or user input data 442 that defines the one or more limits. In other examples, limit display generator 402 can generate the one or more limit interface display elements based on types of data, such as a limit recommendation output 458, default limits stored in other data 371, etc.

Limit adjustor generator 402 generates an interface 448, or a portion of an interface 448, that includes one or more limit adjustor interface display elements that allow for or facilitate adjustment of a corresponding characteristic limit, for example, grain loss limit adjustor interface display elements, grain brokenness limit adjustor interface display elements, grain cleanliness limit adjustor interface display elements, as well as limit adjustor interface display elements for various other characteristic limits. In one example, the limit adjustor interface display elements may be interactable (e.g., by a user or operator, or both) to cause generation of another interface 448 (which may be displayed separately or as an overlay) that provides for adjustment of a corresponding characteristic limit. In one example, the limit adjustor interface display elements may be interactable (e.g., by a user or an operator, or both) to adjust a value of a corresponding characteristic limit.

Characteristic value display generator 406 generates an interface 448, or a portion of an interface 448, that includes one or more characteristic value interface display elements that each display value(s) of a corresponding characteristic, for example, grain loss value interface display elements, grain brokenness value interface display elements, grain cleanliness value interface display elements, as well as value interface display elements for various other characteristics. In some examples, the characteristic value interface display elements can each display a current value of a corresponding characteristic or one or more past (or previous) values of a corresponding characteristic, or both. In one example, characteristic value display generator 406 generates characteristic value interface display elements based on processed sensor data 440 or raw sensor data 444. For instance, the characteristic values may be based on sensor data, such as processed sensor data 440 or raw sensor data 444. In one example, characteristic value display generator 406 generates characteristic value interface display elements based on outputs 458 generated by control determination system 336. For instance, the characteristic values may be based on outputs 458 generated by control determination system 336.

Information interface display element generator 411 generates an interface 448, or a portion of an interface 448, that includes information interface display elements that can display various types of information, some examples of which will be shown below.

Other display generator 412 generates an interface 448, or a portion of an interface 448, that includes various other interface display elements, some examples of which will be shown below.

Thus, it can be seen that interface generator 333 is operable to generate one or more interfaces 448 that includes various interface display elements.

Interface controller 330 is operable to control one or more interface mechanisms (e.g., 318 or 364, etc.) to display interface(s) 448.

Some example interfaces 448 are shown below in FIGS. 6A-11.

Figure 5:
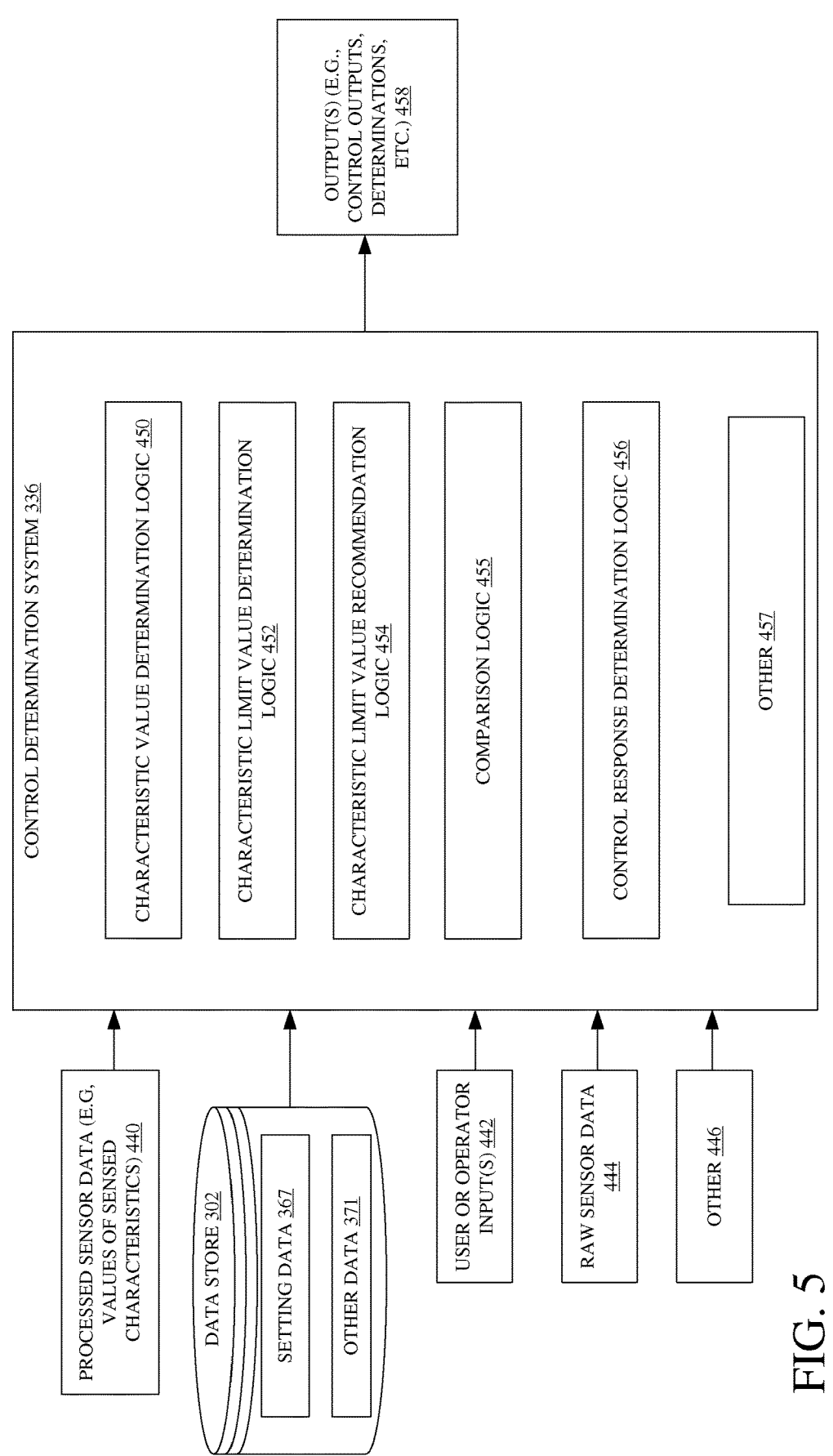
FIG. 5 is a block diagram showing one example of a control determination system.

FIG. 5 is a block diagram of a portion of the agricultural harvesting system architecture 300 shown in FIG. 3. Particularly, FIG. 5 shows, among other things, examples of the control determination system 336 in more detail. As illustrated in FIG. 5, control determination system 336 includes characteristic value determination logic 450, characteristic limit value determination logic 452, characteristic limit value recommendation logic 454, comparison logic 455, control response determination logic 456, and can include other items 457 as well.

As a general overview, control determination system 336 obtains (e.g., receives or retrieves) various data, such as processed sensor data 440 generated by processing system 332, user or operator inputs 442 received through an interface mechanism (e.g., 318 or 364, etc.), raw sensor data 444 generated by sensors 308, data from data stores 302, as well as various other data 446. Control determination system 336 then generates one or more outputs 458 based on one or more of the obtained data.

Characteristic value determination logic 450 determines values of one or more characteristics detected by sensors 308. For example, characteristic value determination logic 450 can determine grain cleanliness values, grain brokenness values, and grain loss values, based on sensor data generated by sensors 308. A characteristic value may be a real time or near-real time value (e.g., a most recently detected value) or may be an average of the characteristic value over a given period (e.g., a value that is an aggregation of a plurality of previously detected characteristic values). The sensor data may be processed sensor data 440 or may be raw sensor data 444. It will be understood that characteristic value determination logic 450 can determine values of various other characteristics.

Characteristic limit value determination logic 452 determines values of one or more characteristic limits. For example, characteristic limit value determination logic 452 can determine grain cleanliness limit values, grain brokenness limit values, and grain loss limit values. Characteristic limit value determination logic 452 can determine limit values based on operator or user inputs 442 provided through an interface (e.g., 448) on an interface mechanism (e.g., 318 or 364, etc.), such as an operator or user inputs that adjust or set limit values. In another example, the limit values may be based on various other data 446, such as default, preset, or recommend values provided by the manufacturer, or some other party. It will be understood that characteristic limit value determination logic 452 can determine limit values of various other characteristics.

Comparison logic 455 compares characteristic values, determined by characteristic value determination logic 450, to corresponding characteristic limit values, determined by characteristic limit value determination logic 452 and generates comparison outputs indicative thereof. It will be understood that a comparison output can indicate a difference or whether there is a difference between two values (e.g., between a characteristic value and a corresponding characteristic limit value). For example, comparison logic 455 may compare a grain cleanliness value determined by characteristic value determination logic 450 to a corresponding grain cleanliness limit value determined by characteristic limit value determination logic 452 and generate a comparison output indicative thereof. Comparison logic 455 may compare a grain brokenness value determined by characteristic value determination logic 450 to a corresponding grain brokenness limit value determined by characteristic limit value determination logic 452 and generate a comparison output indicative thereof. Comparison logic 455 may compare a grain loss value determined by characteristic value determination logic 450 to a corresponding grain loss limit value determined by characteristic limit value determination logic 452 and generate a comparison output indicative thereof. It will be understood that comparison logic 455 can compare values of various other characteristics to corresponding limit values and generate comparison outputs indicative thereof.

Control response determination logic 456 determines and provides, as outputs 458, control outputs that are useable by other items of control system 314 (e.g., communication system controller 329, interface controller 330, subsystem controller 335, etc.) to control one or more other items of agricultural system 300 (e.g., communication system 306, interfaces 318 or 364, or controllable subsystems 316) based on the characteristic values determined by characteristic value determination logic 450 and corresponding characteristic limit values determined characteristic limit value determination logic 452, as well as other data, such as setting data 367. In some examples, control response determination logic 456 determines and provides the control outputs based on comparison outputs provided by comparison logic 455. For example, where a characteristic value deviates (or deviates by a threshold amount) from a corresponding characteristic limit value, control response determination logic 456 may generate a control output. A control output may define a setting for one or more controllable subsystems 316 that are useable by subsystem controllers 335 to generate control signals to adjust (or otherwise set) the settings of one or more controllable subsystems 316. The setting data 367 may be various control algorithms, models (including machine learned models), or lookup tables useable by control response determination logic 456 to generate a control output. For example, the setting data 367 may define how operation of the harvester 100 (e.g., operation of one or more controllable subsystems 316) is to adjust based on a characteristic value deviating from (or otherwise not satisfying) a corresponding characteristic limit value.

Characteristic limit value recommendation logic 453 determines and provides, as outputs 458, characteristic limit value recommendations (e.g., a grain cleanliness limit value recommendation, a grain brokenness limit value recommendation, a grain loss limit value recommendation) which can be provided to a user or an operator, or both, such as by display. The characteristic limit value recommendations may recommend a characteristic limit value that should be set by an operator or user. Characteristic limit value recommendation logic 453 may determine a characteristic limit value recommendation based on upon various data, such as other data 371 indicative of one or more of a crop type being harvested by harvester 100, the particular field at which the harvester 100 is harvesting, as well as information associated with the particular harvester 100 (e.g., historical performance data, model of the harvester, operating ranges, power ratings, etc.).

Figure 6A:
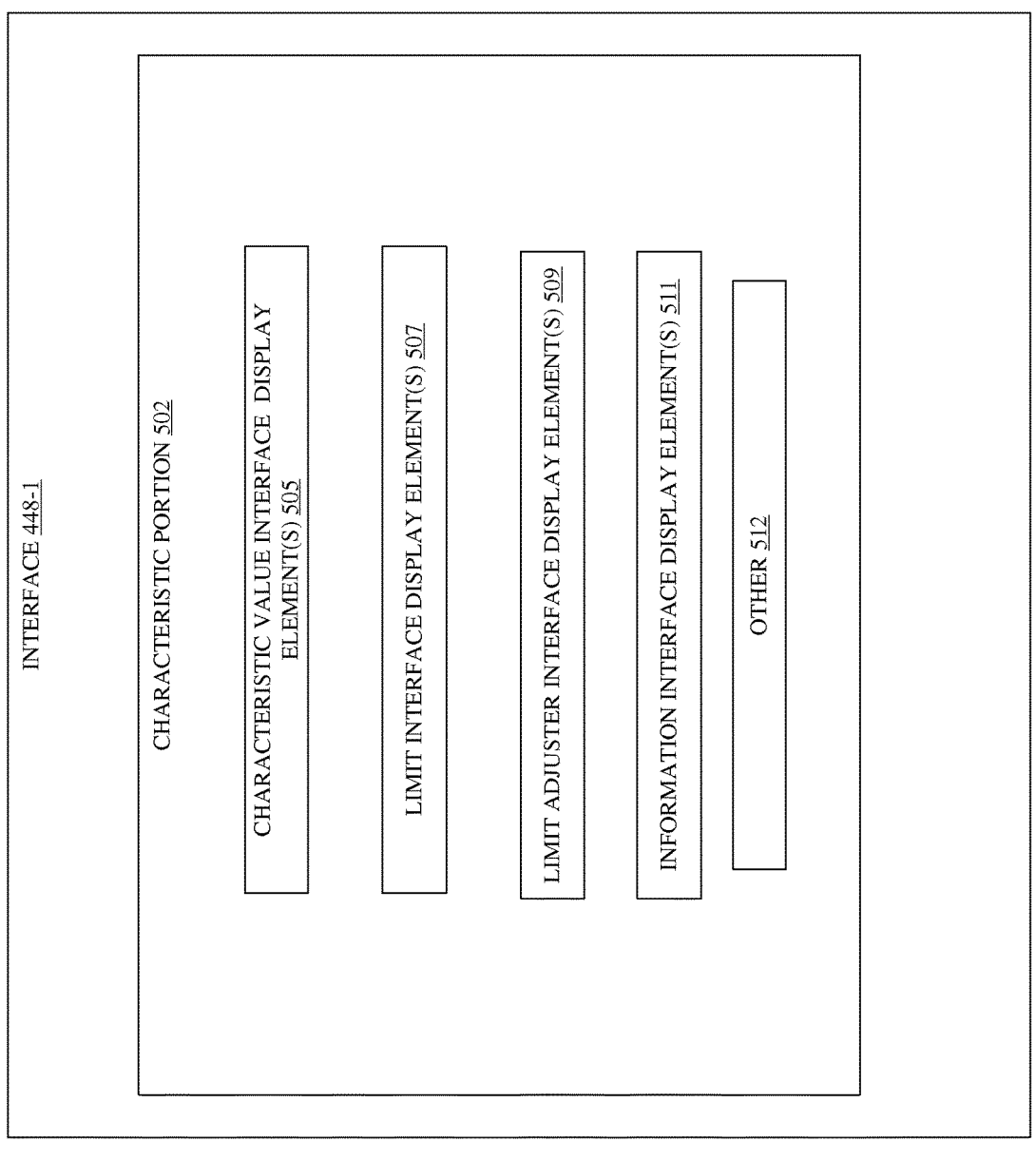
FIG. 6A is a block diagram showing one example interface.

FIG. 6A is a block diagram illustrating one example user interface 448 illustratively shown as 448-1) generated by interface generator 333. As shown in FIG. 6A user interface 448-1 includes a characteristic portion 502. Characteristic portion 502 includes one or more characteristic value interface display elements 505, one or more limit interface display elements 507, one or more limit adjuster interface display elements 509, one or more information display elements 511, and can include various other items 512, such as various other interface display elements.

Characteristic value interface display elements 505 illustratively display one or more values of each of one or more characteristics. Each characteristic value interface display element 505 displays one or more values of a corresponding characteristic. For example, a characteristic value interface display element 505, in the form of a grain cleanliness value interface display element, displays one or more values of grain cleanliness. A characteristic value interface display element 505, in the form of a grain brokenness value interface display element, displays one or more values of grain brokenness. A characteristic value interface display element 505, in the form of a grain loss value interface display element, displays one or more values of grain loss. It will be understood that characteristic value interface display elements 505 can display one or more values of various other characteristics. It will be understood that an interface 448 can include, for each characteristic, of a plurality of characteristics, one or more corresponding characteristic value interface display elements 505, each of the one or more corresponding characteristic value interface display elements 505 can display one or more values of the corresponding characteristic and, in some examples, can each display a different value or a different set of values than another one of the one or more characteristic value interface display elements 505 or can display a same value or a same set of values in a different way than another one of the one or more characteristic value interface display elements 505. Some examples of characteristic value interface display elements 505 are shown below. Characteristic value interface display elements 505 are generated by interface generator 333 (e.g., characteristic value display generator 406).

Limit interface display elements 507 illustratively display limits of one or more characteristic. Each limit interface display element 507 displays a limit of a corresponding characteristic. For example, a limit interface display element 507, in the form of a grain cleanliness limit interface display element, displays a grain cleanliness limit. A limit interface display element 507, in the form of a grain brokenness limit interface display element, displays a grain brokenness limit. A limit interface display element 507, in the form of a grain loss limit interface display element, displays a grain loss limit. It will be understood that limit interface display elements 505 can display limits of various other characteristics. It will be understood that an interface 448 can include, for each characteristic, of a plurality of characteristics, one or more corresponding limit interface display elements 507, each of the one or more corresponding limit interface display elements 507 can display a limit of the corresponding characteristic and, in some examples, can each display the limit in a different way than another one of the one or more limit interface display elements 507. It will be understood that a limit interface display element 507 can be displayed as or otherwise indicate a value of the corresponding limit. Some examples of limit interface display elements

505 are shown below. Limit interface display elements 507 are generated by interface generator 333 (e.g., limit display generator 402).

Limit adjuster interface display elements 509 are interactable by a user or operator, or both, to adjust limits of characteristic. Each limit adjuster interface display element 509 is interactable to adjust a limit of a corresponding characteristic. For example, a limit adjuster interface display element 509, in the form of a grain cleanliness limit adjuster interface display element, provides for interaction to adjust a grain cleanliness limit. A limit adjuster interface display element 509, in the form of a grain brokenness limit adjuster interface display element, provides for interaction to adjust a grain brokenness limit. A limit adjuster interface display element 509, in the form of a grain loss limit adjuster interface display element, provides for interaction to adjust a grain loss limit. It will be understood that limit adjuster interface display elements 505 can include limit adjuster interface display elements for limits of various other characteristics. In some examples, the limit displayed by each limit interface display element 507 will correspondingly adjust based on the adjustment provided by interaction with the corresponding limit adjuster display element 509. Some examples of limit adjuster interface display elements 509 are shown below. Limit adjuster display elements 509 are generated by interface generator 333 (e.g., limit adjuster display generator 404).

Information display elements 511 can display information in various forms, such as textually (e.g., words, numbers, etc.) or non-textually (e.g., icons or symbols, patterns, colors, etc.). The information may provide description of one or more elements of an interface 448, may provide description the interface 448, may provide a prompt for a user or operator, or both, or may provide various other description or information. Some examples of information display elements 511 are shown below. Information interface display elements 511 are generated by interface generator 333 (e.g., information display generator 408).

Other interface display elements 512 can include various other interface display elements, such as interactable interface display elements. Some examples of other interface display elements 512 are shown below. Other interface display elements 512 are generated by interface generator 333 (e.g., other display generator 412).

Figure 6B:
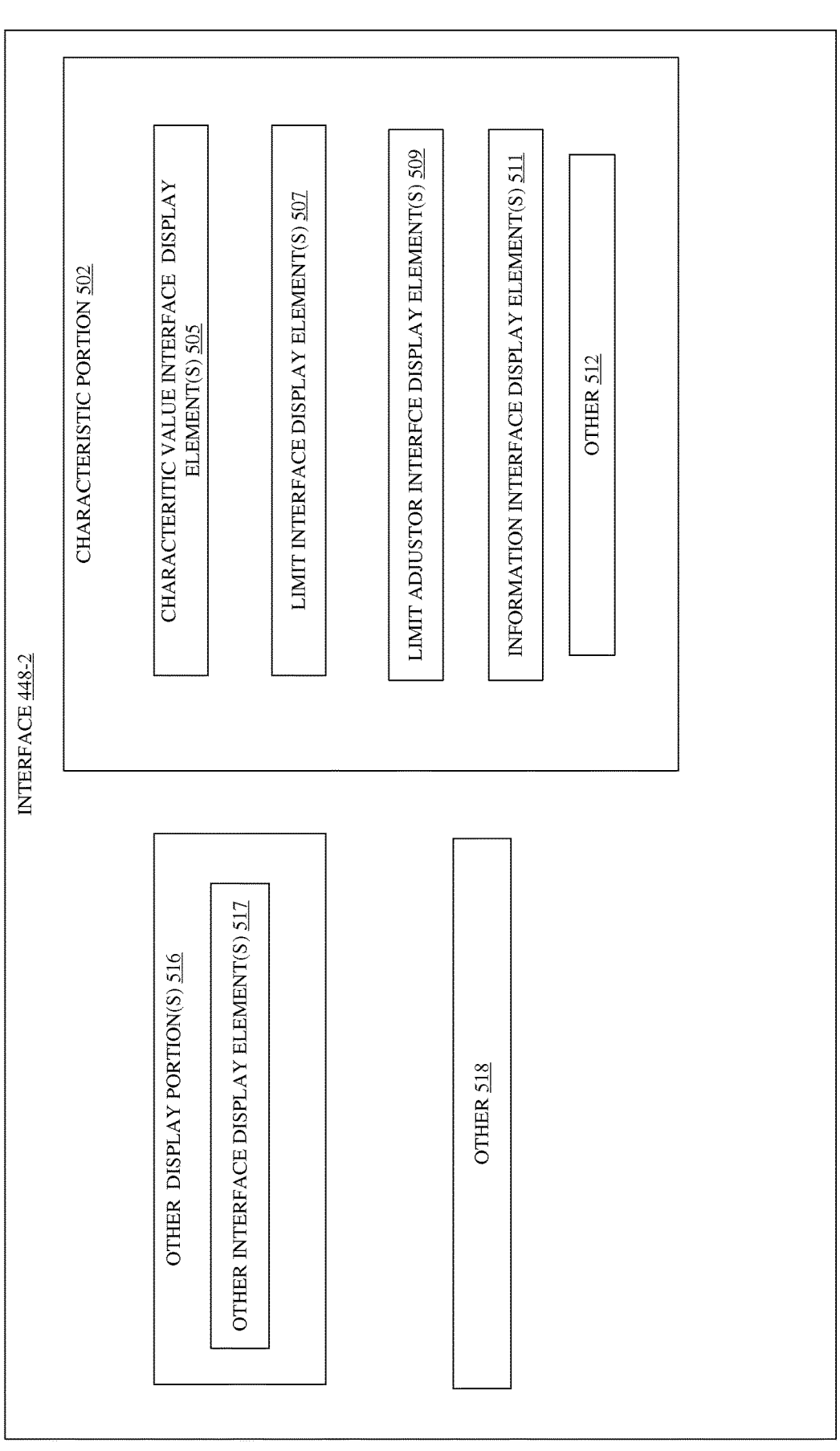
FIG. 6B is a block diagram showing one example interface.

FIG. 6B is a block diagram illustrating one example user interface 448 (illustratively shown as 448-2) generated by interface generator 333. FIG. 6B is similar to FIG. 6A and thus similar items are numbered similarly. FIG. 6A shows that characteristic portion 502 can be a stand-alone interface while FIG. 6B shows that grain processing quality characteristic portion 502 can be a portion of a larger interface that also includes one or more other portions that include various other interface display elements. As illustrated in FIG. 6B, user interface 448-2 includes characteristic portion 502, one or more other portions 516 that each include one or more interface display elements 517, and can include various other items 518.

Each other portion 516 may include one or more interface display elements 517 that display various other items or information, or both, that may be of interest or useable by a user or operator, or both, in the control or operation of harvester 100. Some examples of other portions 516 and interface display elements 517 are shown below. Portion(s) 516 and interface display elements 517 are generated by interface generator 333.

Figure 7:
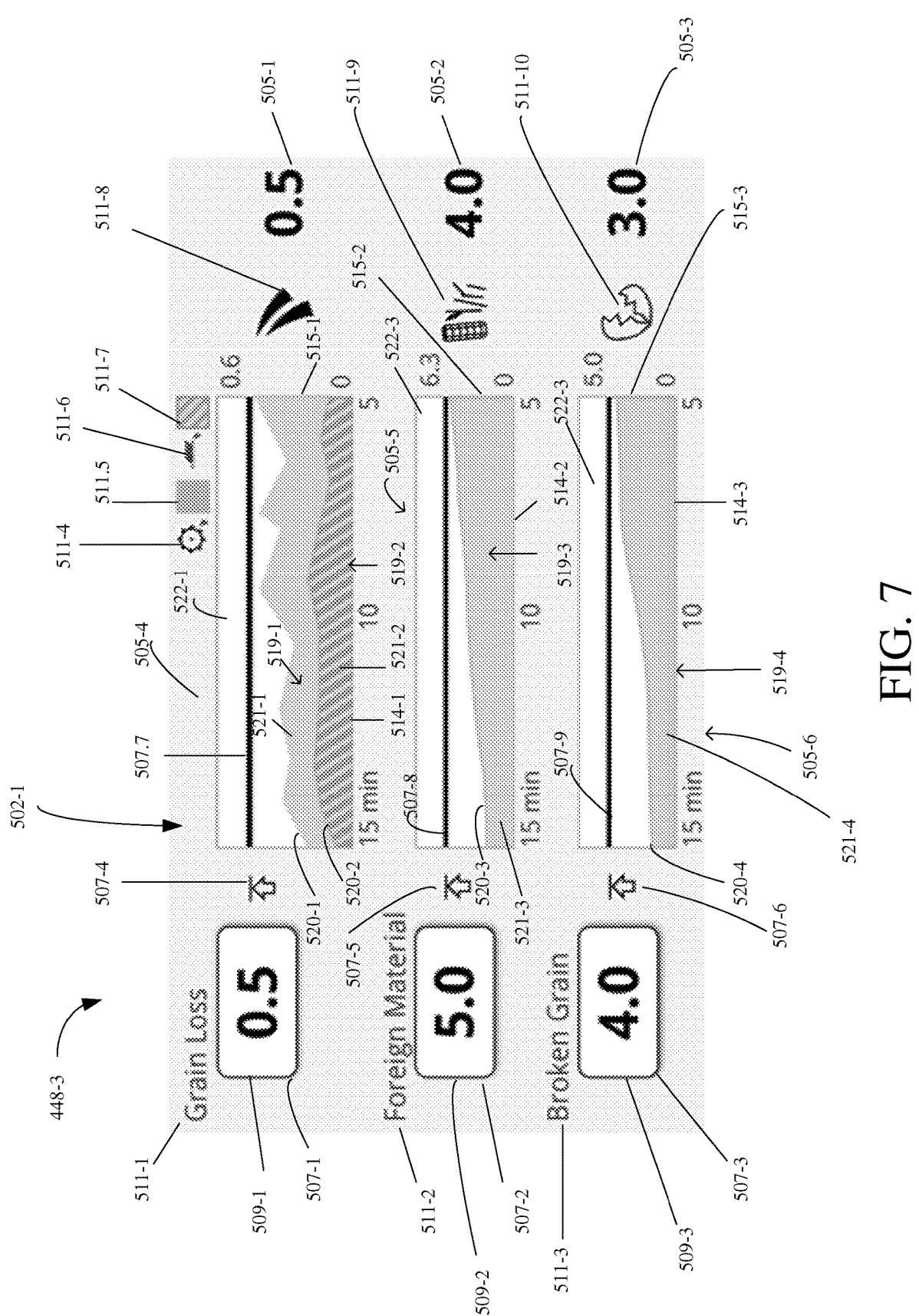
FIG. 7 is a pictorial illustration showing one example interface.

FIG. 7 is a pictorial illustration showing one example of an interface 448 (illustratively shown as 448-3). Interface

448-3 includes an example characteristic display portion 502 (illustratively shown as 502-1). Characteristic display portion 502-1 includes a number of characteristic value interface display elements 505 (illustratively shown as 505-1 to 505-3), a number of limit interface display element 507 (illustratively shown as 507-1 to 507-9), a number of limit adjuster interface display elements 509 (illustratively shown as 509-1 to 509-3), and a number of information interface display elements 511 (illustratively shown as 511-1 to 511-10).

Characteristic value interface display elements 505-1, 505-2, and 505-3 each display a current value of corresponding characteristic (grain loss, grain cleanliness (or foreign material), and grain brokenness (or broken grain), respectively). As previously discussed the current value can be a most recently detected value for the characteristic or an average (or other aggregation) of a plurality of previously detected values of the characteristic over a given time period.

Characteristic value interface display elements 505-4, 505-5, and 505-6 each display a plurality of values of a corresponding characteristic (grain loss, grain cleanliness (or foreign material), and grain brokenness (or broken grain), respectively). Characteristic value interface display elements 505-4, 505-5, and 505-6 are graphs (illustratively area charts) that each include an X axis 514, a Y axis 515, at least one graph display element 519, and a background (or white space) element 522. Each graph display element 519 includes a line display element 520 and a fill display element 521.

Figure 8:
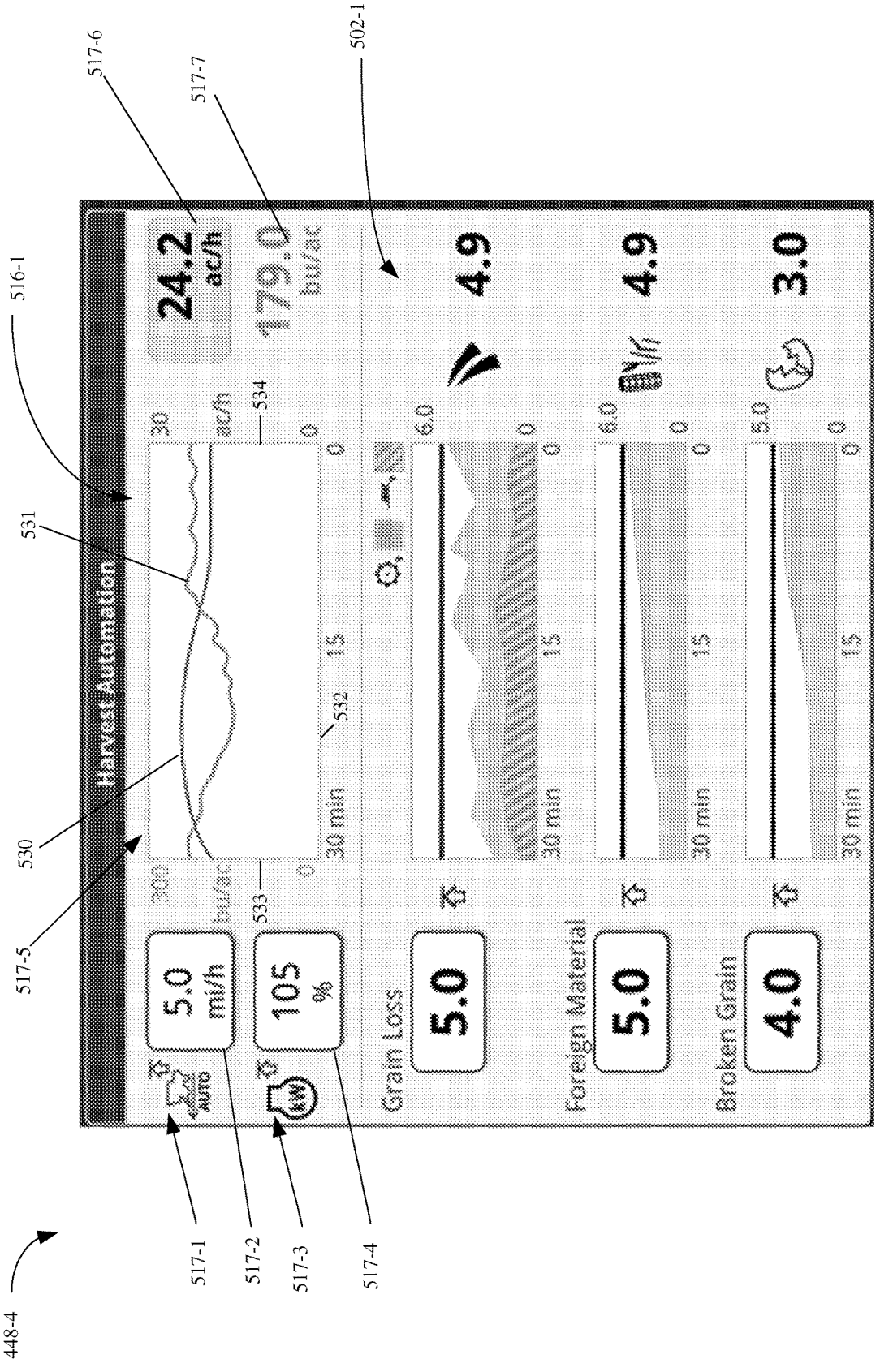
FIG. 8 is a pictorial illustration showing one example interface.

Each X axis 514 (illustratively 514-1, 514-2, and 514-3) represents a time scale. In the illustrated example, each time scale extends from 5 minutes ago to 15 minutes ago. Though, in other examples, a time scale could extend in different time ranges, including from a current time to the same or other time in the past (one example of which is shown in FIG. 8). Each Y axis 515 (illustratively 515-1, 515-2, and 515-3) represents a characteristic value scale for a corresponding characteristic (grain loss, grain cleanliness (or foreign material), and grain brokenness (or broken grain), respectively. Each Y axis 515, in the illustrated example, has a different scale. In one example, he scale corresponds to corresponding limit (indicated by limit interface display elements 507). That is, the scale of each Y axis is scaled according to the corresponding limit of the corresponding characteristic (e.g., the scale's highest value will be beyond the value of the corresponding limit by at least a certain amount).

Each graph display element 519 includes a line display element 520 that indicates the value of the characteristic over time and a fill display element 521 that helps to better visually represent the value of the characteristic over time. Each fill display element 521 can be of a select color or pattern. As shown in FIG. 7, characteristic value interface display element 505-4 includes multiple graph display elements 519 (illustratively 519-1 and 519-2) which separate the grain loss into multiple categories (e.g., as corresponding to distinct subsystems of the harvester 100). Graph display element 519-1 includes a line display element 520-1 and a fill display element 521-1 and represents separator grain loss. Graph display element 519-2 includes a line display element 520-2 and a fill display element 521-2 and represents cleaning shoe grain loss. The area of each graph display element 519-1 and 519-2 illustrates the proportion (or percentage) of the total grain loss that belongs to the respective category. While separator and cleaning shoe are shown, in other examples, grain loss can be separated into other categories (e.g., as corresponding to subsystems other than the separator or cleaning shoe). Additionally, while the illustrated example shows proportions of grain loss separated into corresponding subsystems, in other examples, proportions of other characteristics (e.g., other grain processing quality characteristics) could, alternatively or additionally, be separated into corresponding subsystems.

Graph display element 519-3 includes a line display element 520-3 and a fill display element 521-3 and represents grain cleanliness (or foreign material). Graph element 519-4 includes a line display element 520-4 and a fill display element 521-4 and represents grain brokenness (or broken grain).

Each characteristic value interface display element 505-4, 505-5, and 505-6 includes a corresponding background (or white space) display element 522 (illustratively 522-1, 522-2, and 522-3, respectively). The background (or white space) display elements 522 helps to visually distinguish other display elements of the respective characteristic value interface display element.

Thus, it can be seen that each characteristic value interface display element 505-4, 505-5, and 505-6 display the value of the corresponding characteristic over time.

Limit interface display elements 507-1, 507-2, and 507-3 each display a limit value for a corresponding characteristic (grain loss limit value, grain cleanliness (or foreign material) limit value, and grain brokenness (or broken grain) limit value, respectively). In the illustrated example, limit interface display elements 507-1, 507-2, and 507-3 are each interactable and also function as limit adjuster interface display elements 509 (509-1, 509-2, and 509-3, respectively). Interaction, by a user or operator, or both, will cause interface generator 333 to generate another interface 448 (e.g., 448-6 shown in FIG. 10), displayed separately or as an overlay, to provide adjustment of the corresponding limit.

Limit interface display elements 507-4, 507-5, and 507-6 are each an icon or symbol (illustratively an arrow pointing up to a line) that indicate not only the presence of a limit but also a value of a corresponding limit of a corresponding characteristic (grain loss limit value, grain cleanliness (or foreign material) limit value, and grain brokenness (or broken grain) limit value, respectively). As can be seen, each limit interface display element 507-4, 507-5, and 507-6 is positioned along the Y-axis to indicate the respective limit value.

Limit interface display elements 507-7, 507-8, and 507-9 are each a line, incorporated into a corresponding characteristic value interface display element (505-4, 505-5, and 505-6, respectively) and are positioned along the corresponding Y axis (515-1, 515-2, and 515-3, respectively) to indicate the value of a corresponding limit of a corresponding characteristic (grain loss limit value, grain cleanliness (or foreign material) limit value, and grain brokenness (or broken grain) limit value, respectively).

In one example, when a user or operator adjusts a limit for a corresponding characteristic, the Y axis 515 corresponding to the characteristic to which the adjusted limit corresponds, is rescaled. For example, if a user or operator adjusts the grain loss limit (represented by 507-1) from 0.5 to 0.6, the corresponding Y axis 515-1 will be rescaled from extending from 0 to 0.6 to extending from 0 to 0.7. This rescaling will also alter the position and area of the graph taken up by the graph display element(s) 519 and the position and area of the graph taken up by the background (or white space) display element 522. Additionally, in this example, the corresponding limit interface display element incorporated into the graph (e.g., 507-7) will maintain its position along the Y axis (i.e., the corresponding limit interface display element incorporated into the graph does not move position along the Y axis when the Y axis of the graph is rescaled by adjustment of the corresponding limit, rather the value at the position on the Y axis changes to the adjusted limit value and values at other positions along the Y axis also change accordingly). This is just merely one example. In another example, if a current (or historical) value of a corresponding grain processing quality characteristic goes above the maximum value on the Y axis, the Y axis of the graph is rescaled such that the current (or historical) value of the corresponding grain processing quality characteristic is within the value range of the rescaled Y axis. In such an example, the limit line will move (e.g., down along the Y axis) accordingly to be positioned at the corresponding new position along the rescaled Y axis corresponding to the value of the corresponding limit.

Information interface display element 511-1 displays textual description (words) to describe the characteristic to which display elements in the area of the display portion 502-1 corresponding to information interface display element 511-1 correspond (grain loss in the illustrated example). Information interface display element 511-2 displays textual description (words) to describe the characteristic to which display elements in the area of the display portion 502-1 corresponding to information display element 511-2 correspond (grain cleanliness (or foreign material) in the illustrated example). Information interface display element 511-3 displays textual description (words) to describe the characteristic to which display elements in the area of the display portion 502-1 corresponding to information interface display element 511-3 correspond (grain brokenness (or broken grain) in the illustrated example). Information interface display elements 511-1, 511-2, and 511-3 essentially identify rows on the display portion, each row corresponding to a different characteristic. Information interface display elements 511-1, 511-2, and 511-3 help a user or operator, or both, to navigate and understand display portion 502-1 and display elements of display portion 502-1.

Information interface display elements 511-4, 511-5, 511-6, and 511-7, together, constitute a graph key for interpreting graph 505-4. Information interface display element 511-4 is an icon or symbol (illustratively representing a separator) and is associated with information display element 511-5 which illustrates a color or pattern, or both. Together, interface display elements 511-4 and 511-5 assist a user or operator, or both, in understanding that graph display element 519-1 corresponds to separator grain loss. Information interface display element 511-6 is an icon or symbol (illustratively representing a cleaning shoe) and is associated with information display element 511-6 which illustrates a color or pattern, or both. Together, interface display elements 511-4 and 511-5 assist a user or operator, or both, in understanding that graph element 519-2 corresponds to cleaning shoe grain loss.

Information interface display element 511-8 displays non-textual description (illustratively an icon or symbol for grain loss) to describe the characteristic to which display elements in the area of the display portion 502-1 corresponding to information interface display element 511-8 correspond (grain loss in the illustrated example). Information interface display element 511-9 displays non-textual description (illustratively an icon or symbol for grain cleanliness (or foreign material)) to describe the characteristic to which display elements in the area of the display portion 502-1 corresponding to information display element 511-9 correspond (grain cleanliness (or foreign material) in the illustrated example). Information interface display element 511-10 displays non-textual description (illustratively an icon or symbol for grain brokenness (or broken grain)) to describe the characteristic to which display elements in the area of the display portion 502-1 corresponding to information interface display element 511-10 correspond (grain brokenness (or broken grain) in the illustrated example). Information interface display elements 511-8, 511-9, and 511-10 essentially identify rows on the display portion, each row corresponding to a different characteristic. Information interface display elements 511-8, 511-9, and 511-10 help a user or operator, or both, to navigate and understand display portion 502-1 and display elements of display portion 502-1.

It will be noted that while the example characteristic display portion 502-1 shown in FIG. 7 corresponds to grain loss, grain cleanliness (or foreign material), and grain brokenness (or broken grain), interface generator 333 is operable to generate another example characteristic display portion, similar to grain processing quality characteristic display portion 502-1, that corresponds to a different combination of characteristics. In such an example, one or more display elements of the characteristic display portion would change based on the characteristics of the combination of characteristic of the display portion.

FIG. 8 is a pictorial illustration showing one example of an interface 448 (illustratively shown as 448-4). Interface 448-4 includes characteristic display portion 502-1. It will be noted that in FIG. 8, values of (or represented by) various display elements are different than the example of characteristic display portion 502-1 shown in FIG. 7. Particularly, the grain loss limit value has changed from 0.5 in FIG. 7 to 5.0 in FIG. 8. It will also be noted that Y axis 515-1 and Y axis 515-2 are of a different scale than the example shown in FIG. 7. Additionally, it will be noted that each X axis 514 is of a different scale (extending from 0 (or current time) to 30 minutes ago) than the example shown in FIG. 7 (in which each X axis 514 extending from 5 minutes ago to 15 minutes ago).

Interface 488-4 also includes an example other display portion 516 (illustratively shown as 516-1). Display portion 516-1 is, in the illustrated example, a harvester productivity display portion. Display portion 516-1 includes various examples of other interface display elements 517 (illustratively shown as 517-1 to 517-7). Interface display element 517-1 is an icon or symbol (illustratively a harvester with an arrow pointing in a travel direction along with the word "AUTO" and an arrow pointing up to a line) to indicate a harvester travel speed limit. Interface display element 517-2 corresponds to interface display element 517-1 and displays a limit value for the harvester travel speed limit. Interface display element 517-3 is an icon or symbol (illustratively an outline of an engine with the letters "kW" (kilowatt) and an arrow pointing up to a line) to indicate an engine power output limit. Interface display element 517-4 corresponds to interface display element 517-3 and displays a limit value for engine output power.

Interface display element 517-5 displays a graph (illustratively a line graph) that includes a first line display element 530, a second line display element 531, an X axis 532, a first Y axis 533, and a second Y axis 534. Interface display element 517-5 displays values for multiple characteristics (harvest rate (represented in acres per hour) and yield (represented in bushels per acre). X axis 532 represents a time scale. In the illustrated example, the time scale extends from 0 minutes ago (i.e., current time) to 30 minutes ago. In other examples, the time scale could extend in different time ranges. Y axis 533 represents a characteristic value scale for a corresponding characteristic (bushels per acre for yield in the illustrated example). Y axis 534 represents a characteristic value scale for a corresponding characteristic (acres per hour for harvest rate in the illustrated example). Line display element 530 represents the value of a corresponding characteristic over the time scale represented by X axis 532 (harvest rate value over time in the illustrated example). Line display element 531 represents the value of a corresponding characteristic over the time scale represented by X axis 532 (yield value over time in the illustrated example). It can be seen that each line display element is colored or patterned differently from the other line display element to visually distinguish them. Interface display element 517-6 displays a current value of a corresponding characteristic (current value of harvest rate in the illustrated example) and corresponds to a line display element in the graph (line display element 530 in the illustrated example). It can be seen that interface display element 517-6 is colored or patterned in the same way that its corresponding line display element (530) is colored or patterned. Interface display element 517-7 displays a current value of a corresponding characteristic (current value of yield in the illustrated example) and corresponds to a line display element in the graph (line display element 531 in the illustrated example). It can be seen that interface display element 517-7 is colored or patterned in the same way that its corresponding line display element (531) is colored or patterned. It will be understood that harvest rate and yield are examples of harvester productivity characteristics.

Thus, it can be seen that interface 488-4 allows a user or operator, or both, to understand how performance as it relates to various characteristics, such as grain loss, grain cleanliness, and grain brokenness, and their limits, relates to different aspects of harvester performance (e.g., productivity, such as harvest rate (acres per hour) and yield (bushels per acre)). In this way, as the user or operator adjusts various limits, the user or operator, or both, can see how such adjustment affects broader aspects of harvester performance.

Figure 9:
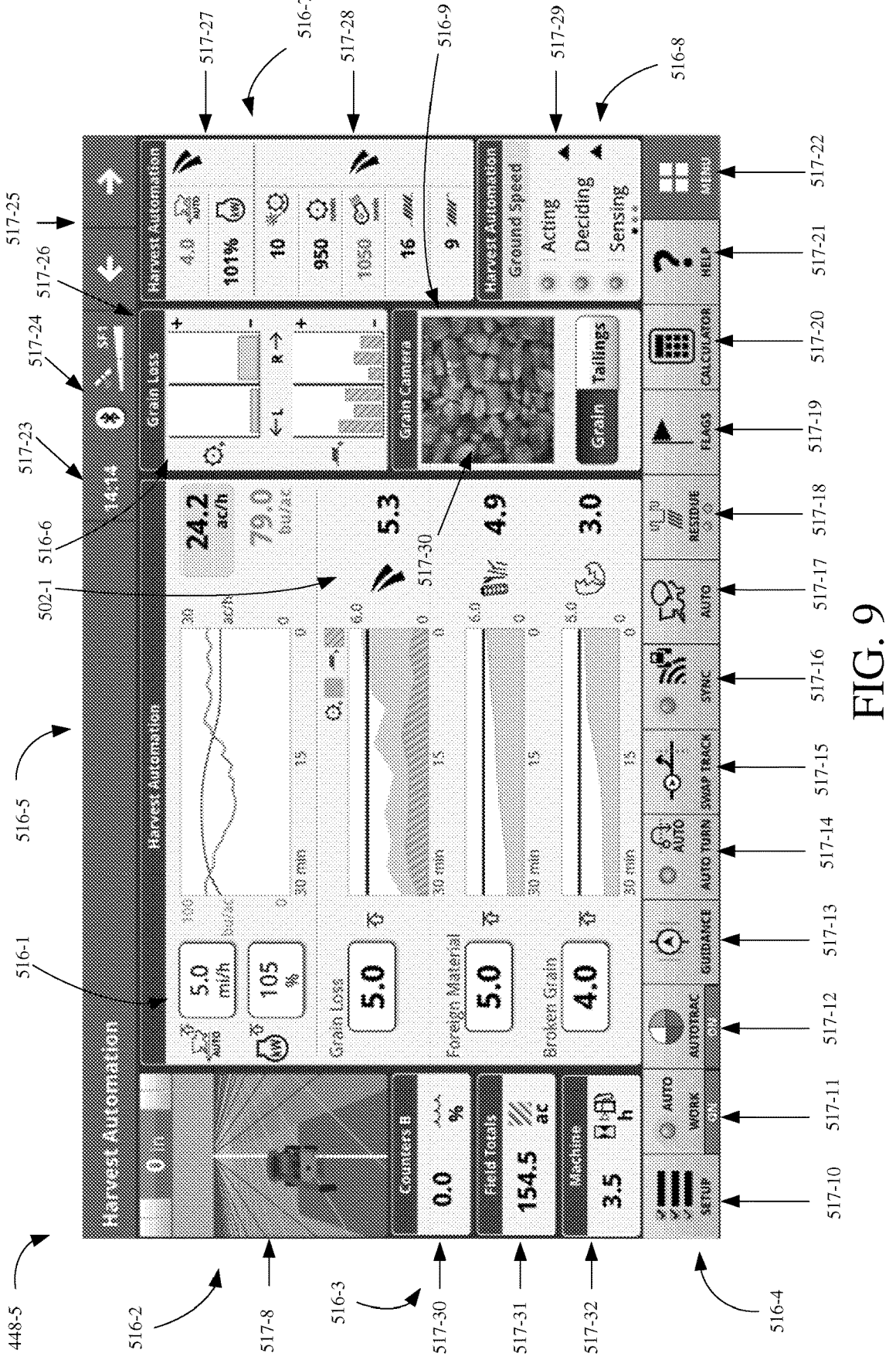
FIG. 9 is a pictorial illustration showing one example interface.

FIG. 9 is a pictorial illustration showing one example interface 448 (illustratively 448-5). Interface 448-5 includes characteristic display portion 502-1 and display portion 516-1. It will be noted that in FIG. 9, values of (or represented by) various display elements of characteristic display portion 502-1 are different than the example of characteristic display portion 502-1 shown in FIGS. 7-8. It will be noted that in FIG. 9, values of (or represented by) various display elements of display portion 516-1 are different than the example of display portion 516-1 shown in FIG. 8.

Interface 448-5 includes a plurality of example other display portions 516 (illustratively shown as 516-1 to 516-9). 516-1 was previously described in FIG. 8. Display portion 516-2 includes an example other interface display element 517 (illustratively shown as 517-8). Interface display element 517-8 displays a current position, heading, travel route, and route travelled of harvester 100. Display portion 516-3 includes a plurality of example other interface display elements 517 (illustratively shown as 517-30, 517-31, and 517-32). Interface display element 517-30 displays a current grain moisture value (in percentage) indicative of a grain moisture of grain harvested by harvester 100. While the example of interface display element 517-30 shown in FIG. 9, shows that current grain moisture is zero (0.0%) it will be understood that this is for illustrative purposes only. It will be understood that interface display element 517-30 can show a current grain moisture, for example, but not by limitation, twelve percent (12.0%) as well as various other values. Interface display element 517-31 displays a total amount of acres harvested in the current field at which harvester 100 is harvesting. As illustrated in FIG. 9, interface display element 517-31 shows that one hundred and fifty-four and one-half (154.5) acres have been harvested at the current field. Interface display element 517-32 displays an amount of time until harvester 100 is out of fuel. As illustrated in FIG. 9, interface display element 517-32 shows that the fuel tank of harvester 100 will be empty in three and one-half (3.5) hours.

Display portion 516-4 comprises a tool bar and includes a plurality of example other interface display elements 517 (illustratively shown as 517-10 to 517-22). Interface display element 517-10 displays a setup menu icon or symbol and is interactable, by a user or operator, or both, to cause interface generator 333 to generate a setup menu interface, as an overlay or separately. Interface display element 517-11 displays whether the harvester 100 has detected that it is in a harvesting state and is recording work (e.g., collecting and storing sensor data) and is interactable, by a user or operator, or both, to generate a harvest state interface, as an overlay or separately, to allow the user or operator, or both, to adjust how the harvest state is determined. Interface display element 517-12 displays whether automatic steering control functionality for controlling the heading of harvester 100 is on and is interactable, by a user or operator, or both, to turn the automatic steering control functionality on and off. Interface display element 517-13 displays whether route guidance lines will appear in display element 517-8 of display portion 516-2 and is interactable, by a user or operator, or both, to select whether guidance lines will appear or not. Interface display element 517-14 displays whether automatic turning control functionality for controlling steering (specifically turning at the end of a pass) of harvester 100 is on and is interactable, by a user or operator, or both, to turn the automatic turning control functionality on and off. Interface display element 517-15 displays an icon or symbol for swap track functionality as is interactable by a user or operator, or both, to cause harvester 100 (via control system 314) to swap from a current guidance track (part of a route) or from a next planned guidance track to a different guidance track. Interface display element 517-16 displays a sync icon or symbol and indicates whether the harvester 100 is synced with other items of agricultural harvesting system 300 or with other machines, such as other harvesters at the same worksite or with receiving machines (e.g., grain carts) at the same worksite. Interface display element 517-17 is interactable by a user or operator, or both, to generate a settings and preferences interface, as an overlay or separately, that allows the user or operator, or both, to see current settings and preferences for various automation systems as well as their status, and to provide for adjustment of the settings and preferences. Interface display element 517-18 displays a residue icon or symbol as well as two lights that indicate which direction residue is being thrown, more heavily, from harvester 100 and is interactable by a user or operator, or both, to switch the direction (e.g., from left to right or vice versa). Interface display element 517-19 displays a flag icon or symbol and is interactable by a user or operator, or both, to cause control system 314 to geographically mark a spot (current position of harvester 100) and store the location (e.g., in data store 302) which can later be represented in a map. A user or operator, or both, may wish to save a location for later reference due to something observed at that location during operation. Interface display element 517-20 displays a calculator icon or symbol and is interactable by a user or operator, or both, to cause interface generator 333 to generate, as an overlay or separate display, an interactable calculator interface. Interface display element 517-21 displays a help icon or symbol and is interactable by a user or operator, or both, to cause interface generator 333 to generate, as an overlay or separate display, an interactable help interface (e.g., help menu). Interface display element 517-22 displays a main menu icon or symbol and is interactable by a user or operator, or both, to cause interface generator 333 to generate, as an overlay or separate display, an interactable main menu interface.

Display portion 516-5 comprises a tool bar and includes a plurality of example other interface display elements 517 (illustratively shown as 517-23 to 517-25). Interface display element 517-23 displays a clock that shows a current time. Interface display element 517-24 displays connectivity icons or symbols that indicate what types of connectivity functionality is active (e.g., Bluetooth, cellular, internet, satellite, etc.) as well their status. Interface display element 517-25 displays arrow icons or symbols that are interactable by a user or operator, or both, to cause interface generator 333 to generate a different interface 448 (e.g., allows a user or operator, or both, to switch between interfaces 448).

Display portion 516-6 includes an example other interface display element 517 (illustratively shown as 517-26). Interface display element 517-26 left and right separator grain loss and left and right cleaning shoe grain loss.

Display portion 516-7 includes example other interface display elements 517 (illustratively shown as 517-27 and 517-28). Interface display element 517-28 displays current values for various parameters of harvester 100 (illustratively shown as current harvester travel speed and current engine power output). In the illustrated example, interface display element 517-28 corresponds to interface display elements 517-1 to 517-4.

Display portion 516-8 includes an example other interface display element 517 (illustratively shown as 517-29). Interface display element 517-29 displays a status of harvester travel speed automation functionality, whether the harvester travel speed automation functionality is currently acting, deciding, or sensing.

Display portion 516-9 includes an example other interface display element 517 (illustratively shown as 517-30). Interface display element 517-30 is a camera display element that displays an image (or live feed) of camera (e.g., grain camera 380 or observation sensor system 151). In the illustrated example, interface display element 517-30 displays an image (or lived feed) captured by a grain camera 380 (e.g., 150) of grain (and characteristics thereof) as is indicated by the selected and interactable "GRAIN" interface display element. As shown, a user or operator, or both, could instead select the interactable "TAILINGS" interface display element and interface display element 517-30 would instead display an image (or live feed) captured by a camera (e.g., 151) of residue output by harvester 100.

Figure 10:
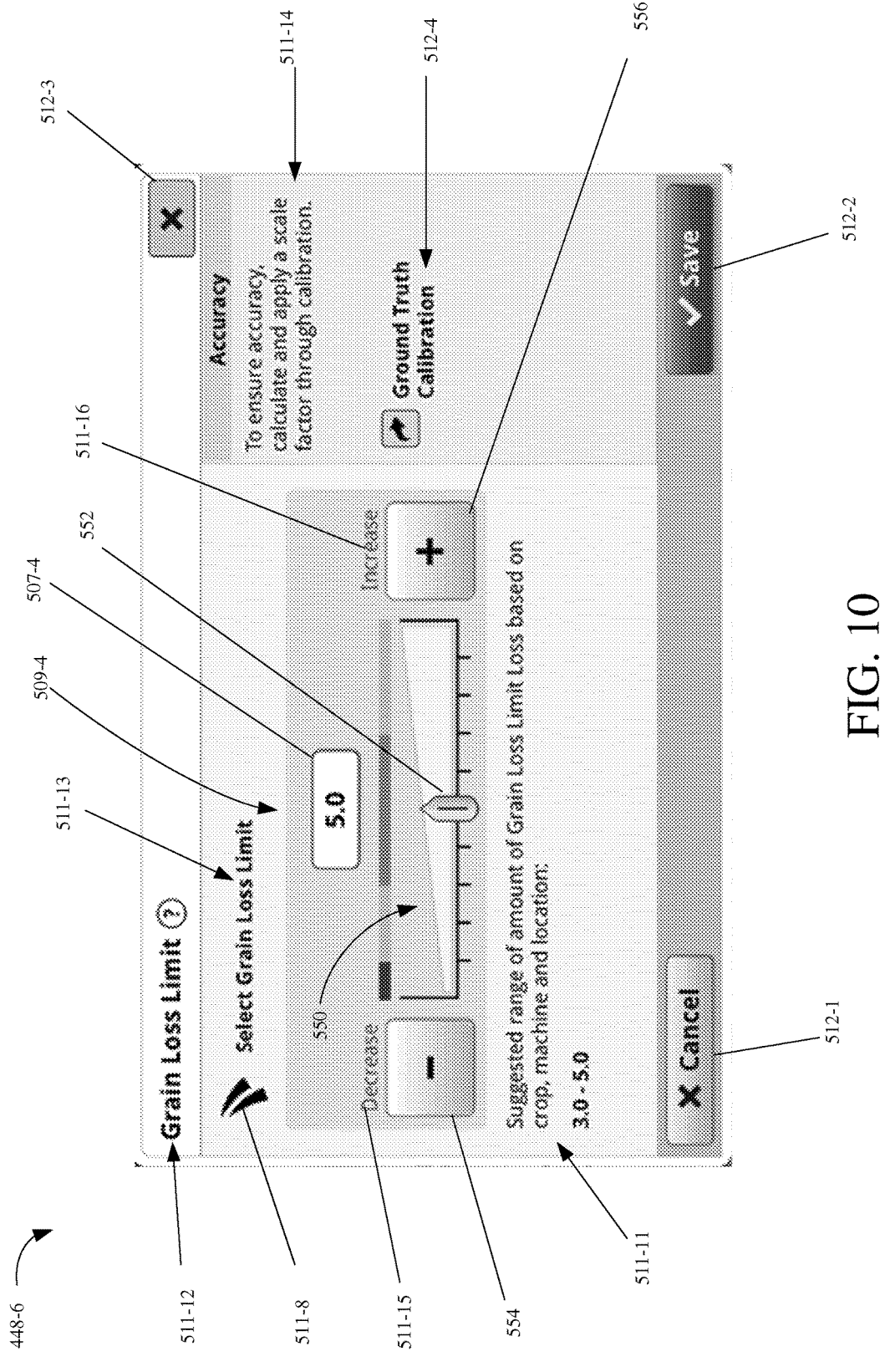
FIG. 10 is a pictorial illustration showing one example interface.

FIG. 10 is a pictorial illustration showing one example interface 448 (illustratively shown as 448-6). Interface 448-6 is an example of a limit adjuster interface generated by interface generator 333 when a user or operator, or both, interact with a limit adjuster display element 509-1, 509-2, or 509-3. In the illustrated example, interface 448-6 is in the form of a grain loss limit adjuster interface generated when a user or operator, or both, interact with grain loss limit adjuster display element 509-1. In other examples, interfaces similar to interface 448-6 could be generated in response to user or operator interaction with other limit adjuster display elements (e.g., 509-2 or 509-3) such as a grain cleanliness (or foreign material) limit adjuster interface or a grain brokenness (or broken grain) limit adjuster interface.

Interface 448-6 includes a limit interface display element 507 (illustratively shown as 507-4), a limit adjuster display element 509 (illustratively shown as 509-4), information display elements 511-8, 511-11, 511-12, 511-13, 511-14, 511-15, and 511-16, and examples of other interface display elements 512 (illustratively shown as 512-1 to 512-4).

Limit interface display element 507-4 displays a limit value for a corresponding characteristic (a grain loss limit value in the illustrated example, but could be limit values of other characteristics in other examples, such as a grain cleanliness (or foreign material) limit value, or a grain brokenness (or broken grain) limit value).

Limit adjuster interface display element 509-4 is interactable, by a user or operator, or both, to adjust the limit value of the corresponding characteristic (to adjust the grain loss limit value in the illustrated example, but could be to adjust the limit value of other characteristics in other examples, such as to adjust a grain cleanliness (or foreign material) limit value, or a grain brokenness (or broken grain) limit value). Limit adjuster interface display element 509-4 includes a scale interface display element 550, a slider interface display element 552, an interactable adjustment interface display element 554, and an interactable adjustment interface display element 556.

In the illustrated example, slider interface display element 552 is currently positioned on scale interface display element 550 at a position to reflect the current limit value (indicated by 507-4). A user or operator, or both, can interact with interactable adjustment interface display elements 554 and 556 to adjust the limit value which will also cause slider interface display element 552 to change its position on scale interface display element 550. Interaction with interactable adjustment interface display element 554 will cause the limit value to decrease incrementally and cause slider interface display element 552 to move, incrementally, in a first direction (to the left in the example illustrated in FIG. 10) to reflect the adjusted (decreased) limit value. It can be seen that interactable adjustment interface display element 554 includes a "−" (minus) icon or symbol to indicate that interaction with interactable adjustment interface display element 554 reduces the limit value. Interaction with interactable adjustment interface display element 556 will cause the limit value to increase incrementally and cause slider interface display element 552 to move, incrementally, in a second direction (to the right in the example illustrated in FIG. 10) to reflect the adjusted (increased) limit value. It can be seen that interactable adjustment interface display element 556 includes a "+" (plus) icon or symbol to indicate that interaction with interactable adjustment interface display element 556 increases the limit value.

Information interface display element 511-8 was previously shown and described. Information interface display element 511-11 provides textual description (e.g., words) of a recommended limit and a value (or value range) of recommended limit output by control determination system 336 (e.g., characteristic limit value recommendation logic 336). As can be seen, information interface display element 511-11 explains that a limit in the range of 3.0-5.0 is recommended given the crop type, the machine model of harvester 100, and the location at which harvester 100 is harvesting.

Information interface display element 511-12 provides textual description (e.g., words) of interface 448-6. In the illustrated example, information interface display element 511-12 includes the words "GRAIN LOSS LIMIT" but in examples where interface 448-6 corresponds to other characteristics, information interface display element 511-12 could include different words corresponding to those other characteristics (e.g., "GRAIN CLEANLINESS (OR FOREIGN MATERIAL) LIMIT" or "GRAIN BROKENNESS (OR BROKEN GRAIN) LIMIT").

Information interface display element 511-13 provides textual description (or a prompt) (e.g., words) that describes (or prompts interaction with) limit adjuster interface display element 509-4. In the illustrated example, information interface display element 511-13 includes the words "SELECT GRAIN LOSS LIMIT" but in examples where interface 448-6 corresponds to other characteristics, information interface display element 511-13 could include different words corresponding to those other characteristics (e.g., "SELECT GRAIN CLEANLINESS (OR FOREIGN MATERIAL) LIMIT" or "SELECT GRAIN BROKENNESS (OR BROKEN GRAIN) LIMIT").

Information interface display element 511-14 provides textual description (or a prompt) (e.g., words) that describes (or prompts interaction with) other interface display element 512-4. In the illustrated example, interface display element 511-4 provides description or a prompt to interact with other interface display element 512-4 to execute a calibration operation.

Information interface display element 511-15 provides textual description (e.g., word) that describes interactable adjustment interface display element 554 (or that interaction with interactable adjustment interface display element 554 will decrease the limit value). Information display element 511-16 provides textual description (e.g., word) that describes interactable adjustment interface display element 556 (or that interaction with interactable adjustment interface display element 556 will increase the limit value).

Other interface display element 512-1 is a cancel interface display element that allows for interaction by a user or operator, or both, to cancel adjustment to the limit value. Other interface display element 512-2 is a save interface display element that allows for interaction by a user or operator, or both, to save (or enter) adjustment to the limit value such that the adjusted limit value will now be used as the limit value. Other interface display element 512-3 is an exit interface display element that allows for interaction by a user or operator, or both, to exit out of interface 448-6 and return to a different interface 448. Other interface display element 512-4 is a calibration interface display element that allows for interaction by a user or operator, or both, to cause harvester 100 to execute a calibration operation.

As noted above, interface 448-6 in FIG. 10 is illustrated as a grain loss limit adjuster interface, but in other examples, could be limit adjuster interfaces for other characteristics, such as grain cleanliness (or foreign material) or grain brokenness (or broken grain). When the interface 448-6 corresponds to other characteristics, various display elements of the interface 448-6 will correspondingly change to reflect the different characteristic, such as interface display elements 511-11, 511-12, and 511-13. Additionally, instead of having interface display element 507-4 and interface display element 511-8, the different interface may have interface display element 507-5 and interface display element 511-9 or interface display element 507-6 and interface display element 511-10. In another example, in response to interaction with any of the limit adjuster display elements 509-1, 509-2, or 509-3 an interface similar to interface 448-6 could be generated but would also include a limit adjuster display element 509 (similar to 509-4) for each grain processing quality characteristic corresponding to each of 509-1, 509-2, and 509-3.

Figure 11:
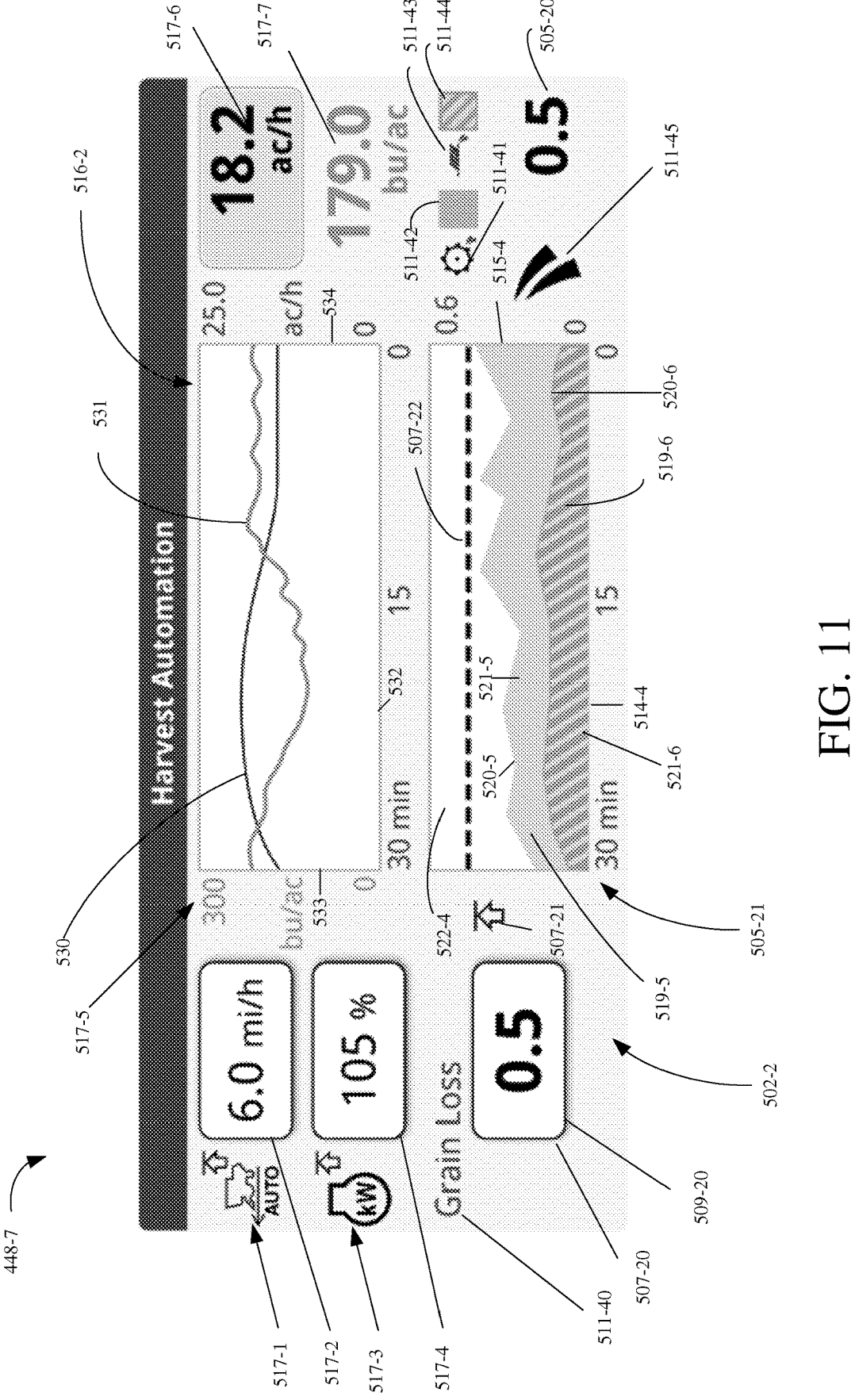
FIG. 11 is a pictorial illustration showing one example interface.

FIG. 11 is a pictorial illustration showing one example interface 448 (illustratively 448-7). Interface 448-7 includes a characteristic display portion 502 (illustratively 502-2) and an example other display portion 516 (illustratively shown as 516-2). Interface 448-7 is similar to interface 448-4 shown in FIG. 8 except that the characteristic display portion 502 (illustratively 502-2) of interface 448-7 includes elements for only one characteristic as opposed to the multiple characteristics of characteristic display portion 502-1.

Characteristic display portion 502-2 includes a number of characteristic value interface display elements 505 (illustratively 505-20 and 505-21), a number of limit interface display elements 507 (illustratively 507-20 to 507-22), a limit adjuster interface display element 509 (illustratively shown as 509-20), and a number of information display elements 511 (illustratively 511-40 to 511-45).

Characteristic value interface display element 505-20 can be similar to characteristic value interface display element 505-1, 505-2, or 505-3 (similar to 505-1 in the illustrated example) and displays a current value of a corresponding characteristic, such as a corresponding grain processing quality characteristic. In the illustrated example, characteristic value interface display element 505-20 displays a current value of grain loss. Characteristic value interface display element 505-21 can be similar to characteristic value interface display elements 505-4, 505-5, or 505-6 (similar to 505-4 in the illustrated example) and displays a plurality of values of a corresponding characteristic, such as a corresponding gran processing quality characteristic. In the illustrated example, characteristic value interface display element 505-21 displays a plurality of values of grain loss. Characteristic value interface display element 505-21 is a graph (illustratively an area chart) that includes an X axis 514 (illustratively 514-4), a Y axis 515 (illustratively 515-4), a plurality of graph display elements 519 (illustratively 519-5 and 519-6), and a background (or white space) element 522 (illustratively 522-4).

X axis 514-4 represents a time scale. In the illustrated example, the time scale extends from a current time (0 minutes ago) to 30 minutes ago. Though, in other examples, the time scale could extend in different time ranges. Y axis 515-4 represents a characteristic value scale for the corresponding characteristic. In one example, the characteristic value scale corresponds to a corresponding limit (indicated by limit interface display element 507-20). That is, the scale of the Y axis 515-4 is scaled according to the corresponding limit of the corresponding characteristic (e.g., the scale's highest value will be beyond the value of the corresponding limit by at least a certain amount).

Graph display element 519-5 includes a line display element 520 (illustratively 520-5) and a fill display element 521 (illustratively 521-5). Graph display element 519-6 includes a line display element 520 (illustratively 520-6 and a fill display element 521 (illustratively 521-6). As shown in FIG. 11, graph display element 519-5 and graph display element 519-6 separate the characteristic (illustratively grain loss) into multiple categories (e.g., as corresponding to distinct subsystems of harvester 100). Line display element 520-5 and fill display element 521-5 represent separator grain loss. Line display element 520-6 and fill display element 521-6 represent cleaning shoe grain loss. The area of each graph display element 519-5 and 519-6 illustrates the proportion (or percentage) of the total characteristic value (e.g., total grain loss value) that belongs to the respective category (e.g., subsystem). While separator and cleaning shoe are shown, in other examples, a characteristic can be divided into other categories (e.g., as corresponding to subsystems other than the cleaning shoe or separator). Additionally, while the illustrated example shows proportions of grain loss separated into corresponding subsystems, in other examples, proportions of other characteristics (e.g., other grain processing quality characteristics) could, alternatively or additionally, be separated into corresponding subsystems. Background (or white space) display element 522-4 helps to visually distinguish other display elements of characteristic value interface display element 505-21.

Limit interface display element 507-20 can be similar to limit interface display elements 507-1, 507-2, or 507-3 (similar to 507-1 in the illustrated example) and displays a limit value for a corresponding characteristic (grain loss in the illustrated example). In the illustrated example, limit interface display element 507-20 is interactable and also functions as a limit adjuster interface display element 509 (illustratively 509-20). Interaction, by a user or operator, or both, will cause interface generator 333 to generate another interface 448 (e.g., 448-6 shown in FIG. 10), displayed separately or as an overlay, to provide adjustment to the corresponding limit.

Limit interface display element 507-21 can be similar to limit interface display elements 507-4, 507-5, or 507-6 (similar to 507-6 in the illustrated example) and is an icon or symbol (illustratively an arrow pointing up to a line) that indicates not only the presence of a limit but also a value of a corresponding limit of a corresponding characteristic (grain loss limit value in the illustrated example). As can be seen, limit interface display element 507-21 is positioned along the Y-axis 515-4 to indicate the respective limit value.

Limit interface display element 507-22 can be similar to limit interface display elements 507-7, 507-8, or 507-9 (similar to 507-9 in the illustrated example) and is a line incorporated in characteristic value interface display element 505-21 and is positioned along the Y axis 515-4 to indicate the value of a corresponding limit of a corresponding characteristic (grain loss limit value in the illustrated example).

In one example, when a user or operator adjusts a limit for a corresponding characteristic, the Y axis 515 corresponding to the characteristic to which the adjusted limit corresponds, is rescaled. For example, if a user or operator adjusts the grain loss limit (represented by 507-20) from 0.5 to 0.6, the corresponding Y axis 515-4 will be rescaled from extending from 0 to 0.6 to extending from 0 to 0.7. This rescaling will also alter the position and area of the graph taken up by the graph display elements 519 and the position and area of the graph taken up by the background (or white space) display element 522. Additionally, in this example, the corresponding limit interface display element incorporated into the graph (e.g., 507-22) will maintain its position along the Y axis (i.e., the corresponding limit interface display element 507-22 incorporated into the graph does not position along the Y axis when the Y axis of the graph is rescaled by adjustment of the corresponding limit, rather than value at the position on the Y axis changes to the adjusted limit value and values at other positions along the Y axis also change accordingly). This is just merely one example. In another example, if a current (or historical) value of a corresponding grain quality processing quality characteristic goes above the maximum value on the Y axis, the Y axis of the graph is rescaled such that the current (or historical) value of the corresponding grain quality processing quality characteristic is within the value range of the rescaled Y axis. In such an example, the limit line will move (e.g., down along the Y axis) accordingly to be positioned at the corresponding new position along the rescaled Y axis corresponding to the value of the corresponding limit.

Information interface display element 511-45 can be similar to information display elements 511-1, 511-2, or 511-3 (similar to 511-1 in the illustrated example) and displays textual description (words) to describe the characteristic to which display elements in characteristic display portion 502-2 correspond (grain loss in the illustrated example). Information display elements 511-41, 511-42, 511-43, and 511-44 are similar to information interface display elements 511-4, 511-5, 511-6, and 511-7 and, together, constitute a graph key for interpretating graph 505-21. Information interface display element 511-41 is an icon or symbol (illustratively representing a separator) and is associated with information display element 511-42 which illustrates a color or pattern, or both. Together, interface display elements 511-41 and 511-42 assist a user or operator, or both, in understanding that graph display element 519-5 corresponds to separator grain loss. Information interface display element 511-43 is an icon or symbol (illustratively representing a cleaning shoe) and is associated with information display element 511-44 which illustrates a color or pattern, or both. Together, interface display elements 511-43 and 511-44 assist a user or operator, or both, in understanding that graph element 519-6 corresponds to cleaning shoe grain loss. Information interface display element 511-45 is similar to information interface display element 511-8 and display non-textual description (illustratively an icon or symbol for grain loss) to describe the characteristic to which characteristic display portion 502-2 corresponds (grain loss in the illustrated example).

Other display portion 516-2 is similar to other display portion 516-1 and thus, similar items are numbered similarly. It will be noted that the values of various elements of other display portion 516-2 are different than the values of those elements in other display portion 516-1. As can be seen in the example of other display portion 516-2, the limit value for the harvester travel speed limit, as displayed by interface display element 517-1, has changed to 6.0 miles per hour (mi/h). Further, in the example of other display portion 516-2, the value range of the Y axis 534 has changed to 0 to 25.0 acres per hour (ac/h). Additionally, in the example of other display portion 516-2, the current value of harvest rate, as represented by interface display element 517-6, is 18.2 ac/h.

Thus, it can be seen that interface 448-7 allows a user or operator, or both, to understand how performance as it relates to a characteristic, such as grain loss, and its limit, relates to different aspects of harvester performance (e.g., productivity, such as harvest rate (acres per hour) and yield (bushels per acre)). In this way, as the user or operator adjusts a limit of the corresponding characteristic (e.g., adjust the grain loss limit), the user or operator, or both, can see how such adjustment affects broader aspects of harvester performance.

Figure 12:
FIG. 12 is a flow chart illustrating one example of operation of an agricultural harvesting system in generating one or more interfaces.

FIG. 12 shows a flow diagram illustrating one example operation 1300 of agricultural harvesting system architecture 300 in generating one or more interfaces 448.

It is first assumed that harvester 100 is powered on and operating at a field. However, in some examples, operation 1300 can also occur prior to or after operation at a field.

At block 1304, one or more items of data are obtained. For example, at block 1306, sensor data (e.g., 440 or 444, or both) from various sensors 308 can be obtained, such as grain cameras 380 and grain loss sensors 382, as well as various other sensors, including any of the various other sensors described herein. At block 1308 one or more outputs 458 generated by control determination system 336 can be obtained. At block 1310 one or more inputs (e.g., 442) from a user 366 or an operator 360, or both, can be obtained. At block 1312 data (e.g., 367 or 371, or both) from one or more data stores 302 can be obtained. At block 1314 various other data, such as other data 446, can be obtained.

At block 1316 interface generator 333 generates one or more interfaces 448 (e.g., one or more of 448-1, 448-2, 448-3, 448-4, 448-5, and 448-6) based on one or more items of data obtained at block 1304.

At block 1318 interface controller 330 generates one or more control signals to control one or more interface mechanisms (e.g., 318 or 364, or both) to display the one or more interfaces 448 generated by interface generator 333.

At block 1320 it is determined if operation 1300 has been completed. If, at block 1320, it is determined that operation 1300 has not been completed, then processing returns to block 1304. If, at block 1320, it is determined that operation 1300 has been completed, then processing ends.

Figure 13:
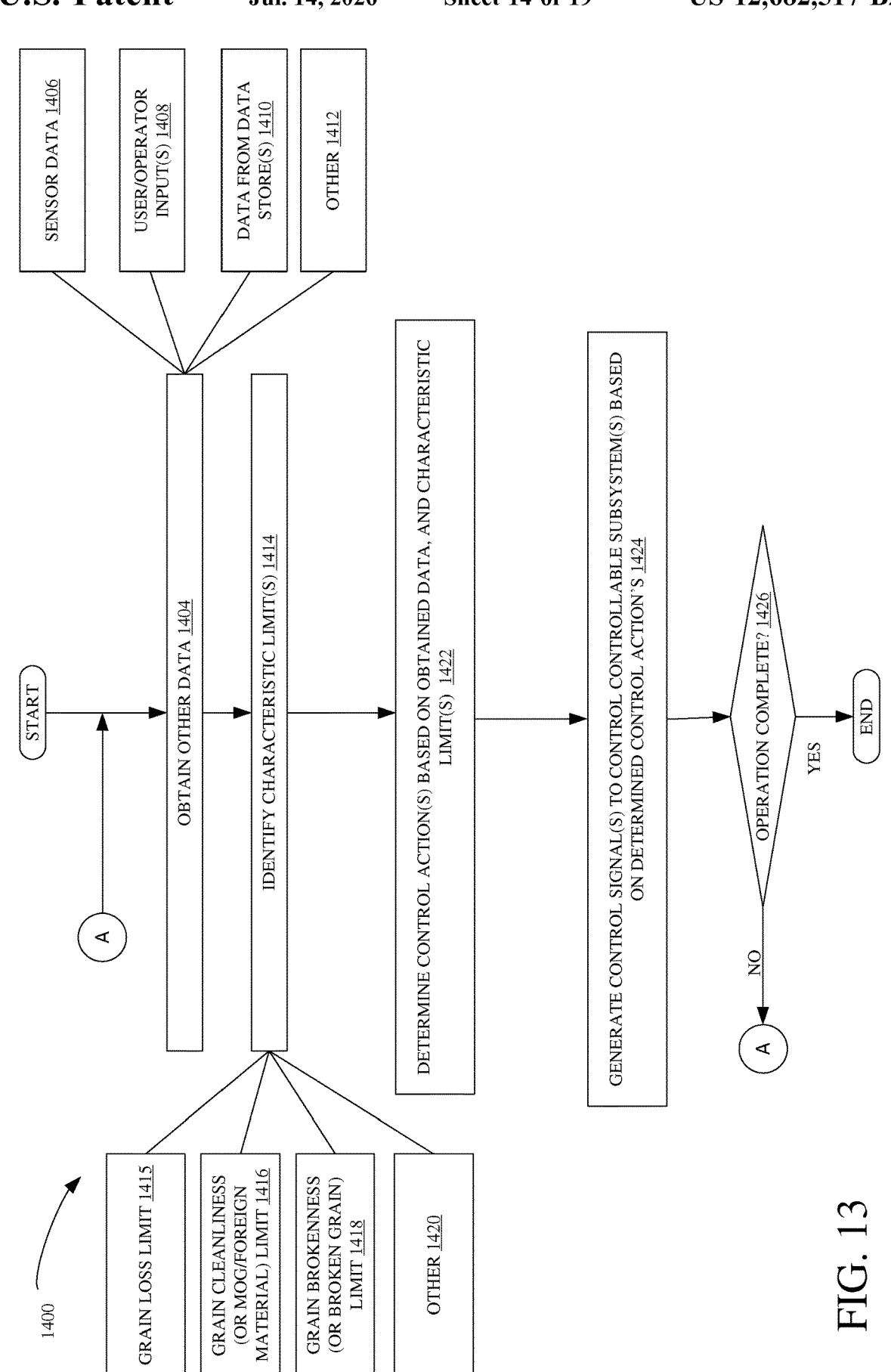
FIG. 13 is a flow chart illustrating one example of operation of an agricultural harvesting system in controlling a harvester.

FIG. 13 shows a flow diagram illustrating one example operation 1400 of agricultural harvesting system architecture 300 in controlling harvester 100. It is first assumed that harvester is powered on and operating at a field. However, in some examples, operation 1400 can occur prior to or after operation at the field.

At block 1404, one or more other items of data are obtained. For example, at block 1406, sensor data (e.g., 440 or 444, or both) from various sensors 308 can be obtained, such as grain cameras 380 and grain loss sensors 382, as well as various other sensors, including any of the various other sensors described herein. At block 1408 one or more inputs (e.g., 442) from a user 366 or an operator 360, or both, can be obtained. At block 1410 data (e.g., 367 or 371, or both) from one or more data stores 302 can be obtained. At block 1412 various other data, such as other data 446, can be obtained.

At block 1406, control determination system 336 identifies a limit of each one of one or more characteristics based on one or more of the one or more items of data obtained at block 1404. For example, at block 1415, control determination system 336 identifies a grain loss limit. At block 1416, control determination system 336 identifies a grain cleanliness (or MOG/foreign material) limit. At block 1418, control determination system 336 identifies a grain brokenness (or broken grain) limit. At block 1420, control determination system 336 identifies a limit for each one of one or more other characteristics.

At block 1422, control determination system 336 determines and generates as one or more outputs 458, control actions based on one or more of the items of data obtained at block 1404 and the one or more identified characteristic limits.

At block 1424, one or more subsystem controllers 335 generate one or more control signals to control one or more controllable subsystems 316 based on the one or more control action outputs 458 generated by control determination system 336.

At block 1426 it is determined if operation 1400 has been completed. If, at block 1426, it is determined that operation 1400 has not been completed, then processing returns to block 1404. If, at block 1426, it is determined that operation 1400 has been completed, then processing ends.

The term display element is used throughout. It will be understood that display elements are visible elements (or components) of interface(s). Sometimes, display elements can also be referred to as interface display elements (or interface elements) or graphical interface display elements (or graphical interface elements). Display elements are generated (e.g., computer generated) and are included as parts of an interface and can display various information in various forms and/or can be interactable to provided or facilitate various functionality. Display elements can include, for example, graphics, text (words, letters, numbers, etc.), fields, symbols or icons, colors, fill, lines, patterns, charts, graphs, tables, images (static images or video images), checkboxes, buttons, lists, toggles, sliders, bars, dropdowns, tags, scales, boxes, breadcrumbs, menus, links, accordions, carousels, pickers, cards, tooltips, widgets, notifications, steppers, tabs, windows, portions of a display, or other aspects of a display. Display elements can include the example display elements described herein.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, generators, and interactions. It will be appreciated that any or all of such systems, components, logic, generators, and interactions may be implemented by hardware items, such as one or more processors, one or more processors executing computer executable instructions stored in memory, memory, or other processing components, some of which are described below, that perform the functions associated with those systems, components, logic, generators, or interactions. In addition, any or all of the systems, components, logic, generators, and interactions may be implemented by software that is loaded into a memory and is subsequently executed by one or more processors or one or more servers or other computing component(s), as described below. Any or all of the systems, components, logic, generators, and interactions may also be implemented by different combinations of hardware, software, firmware, etc., some examples of which are described below. These are some examples of different structures that may be used to implement any or all of the systems, components, logic, generators, and interactions described above. Other structures may be used as well.

Figure 14:
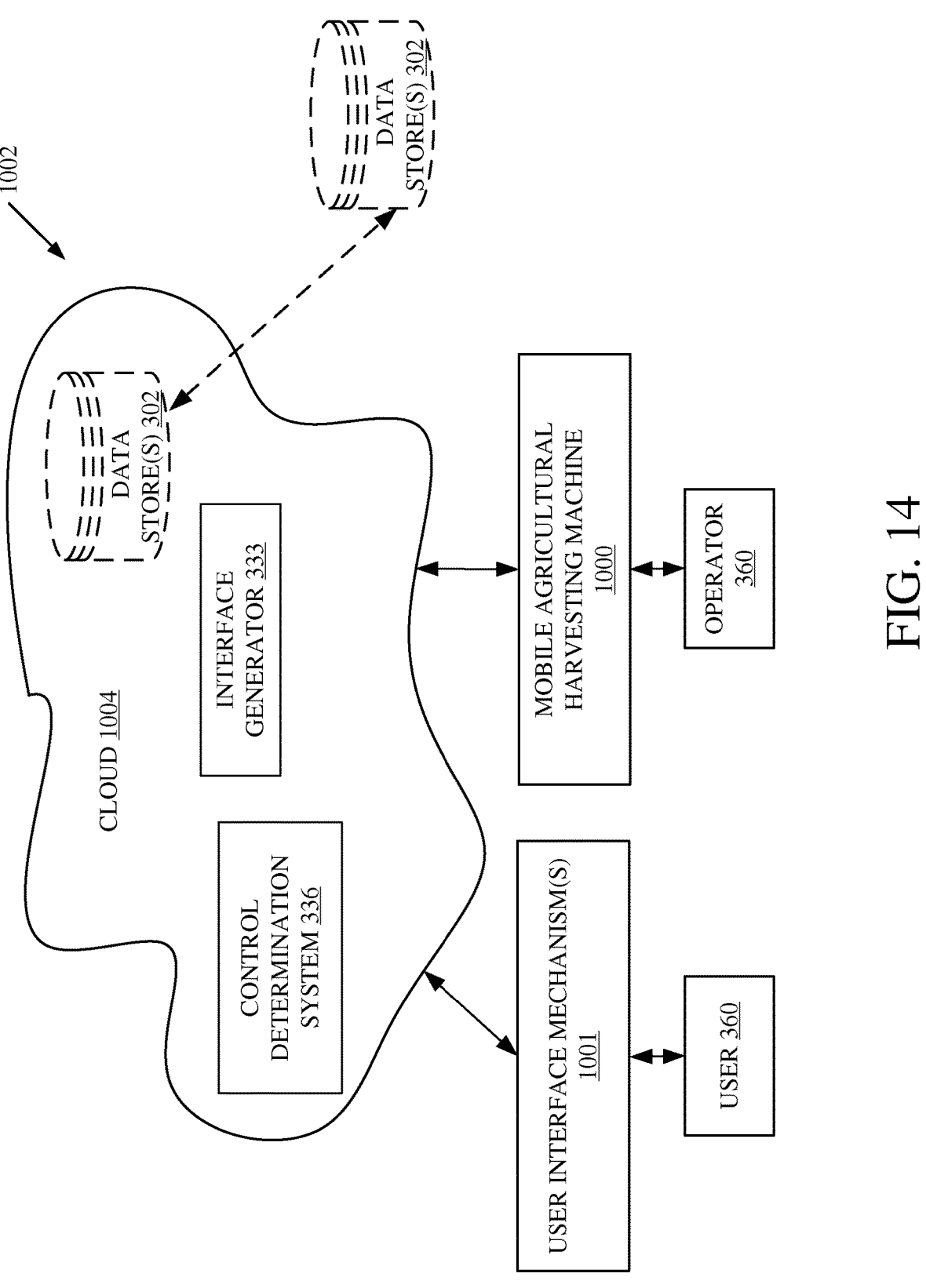
FIG. 14 is a block diagram showing one example of a mobile agricultural harvesting machine in communication with a remote server environment.

FIG. 14 is a block diagram of a remote server architecture 1002. FIG. 14 also shows a mobile agricultural harvesting machine 1000 (also referred to as harvester 1000), which may be similar to mobile agricultural harvesting machine 100, and a user interface mechanism 1001, which may be similar to user interface mechanisms 364, in communication with elements in the remote server architecture 1002. In some examples, remote server architecture 1002 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 14, some items are similar to those shown in previous figures and those items are similarly numbered. FIG. 14 specifically shows that interface generator 333 and control determination system 336 may be located at a server location 1004 that is remote from the harvester 1000 and remote from the user interface mechanism 1001. Therefore, in the example shown in FIG. 14, harvester 1000 and user interface mechanism 1001 access those items through remote server location 1004. In other examples, various other items may also be located at server location 1004, such as data stores 302, other components of control system 314, as well as various other items.

FIG. 14 also depicts another example of a remote server architecture. FIG. 14 shows that some elements of previous figures may be disposed at a remote server location 1004 while others may be located elsewhere. By way of example, data store 302 may be disposed at a location separate from location 1004 and accessed via the remote server at location 1004. Regardless of where the elements are located, the elements can be accessed directly by harvester 1000 and user interface mechanism 1001 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the harvester 1000 comes close to the machine containing the information collection system, such as a fuel truck prior to fueling, the information collection system collects the information from the harvester 1000 using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on the harvester 1000 until the harvester 1000 enters an area having wireless communication coverage. The harvester 1000, itself, may send the information to another network.

It will also be noted that the elements of previous figures, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1002 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 15:
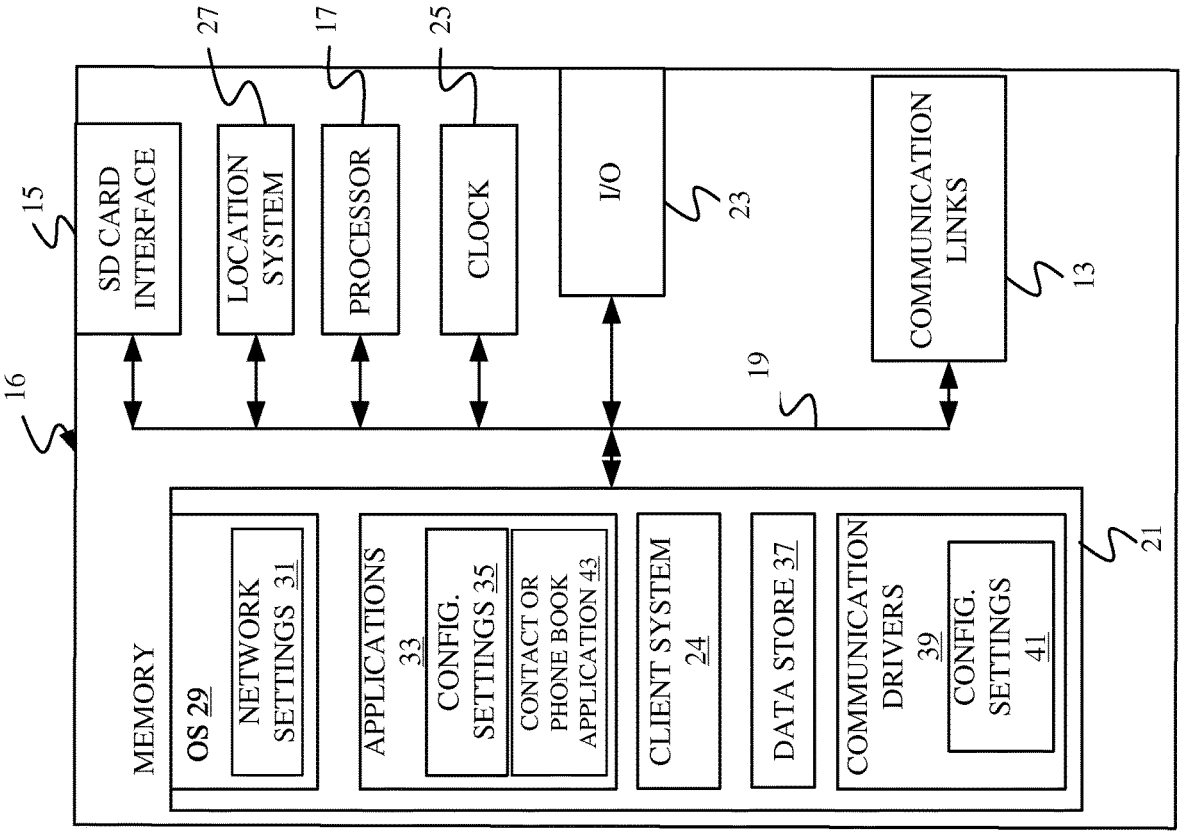
FIGS. 15-17 show examples of mobile devices that can be used in an agricultural harvesting system.
Figure 16:
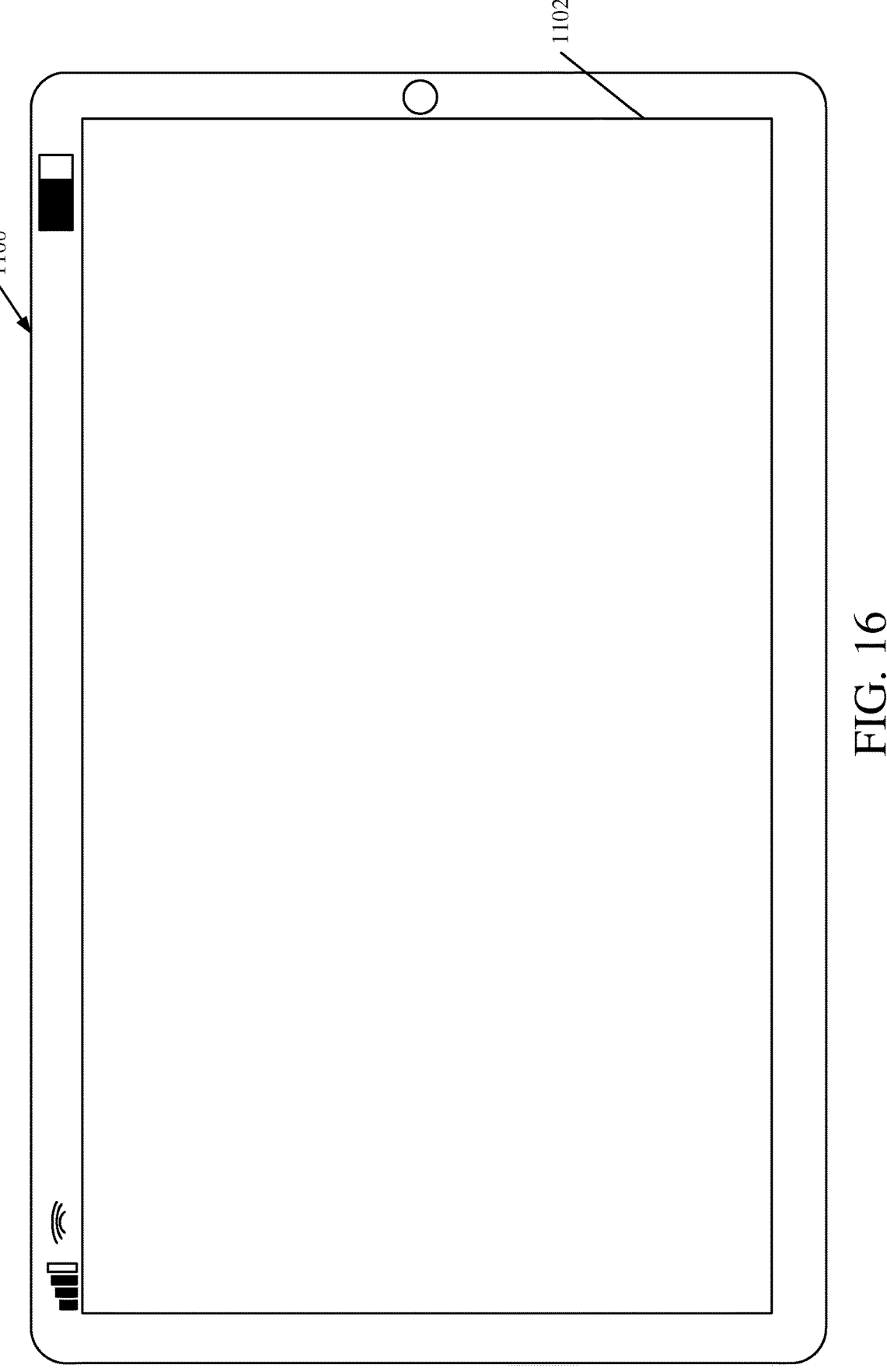
Figure 17:
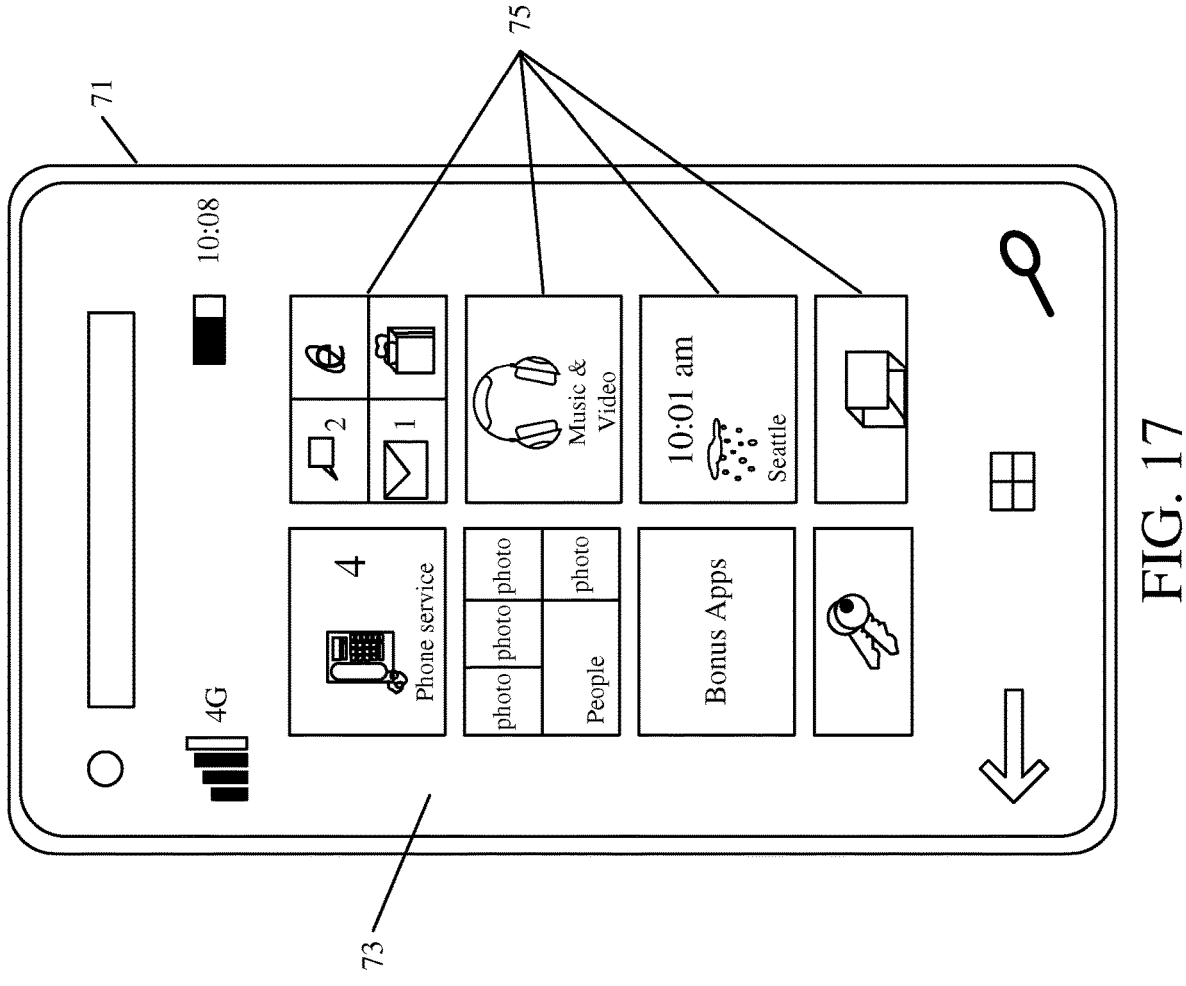

FIG. 15 is a simplified block diagram of one illustrative example of a handheld or mobile computing device that can be used as a user's or client's handheld device 16, in which the present system (or parts of it) can be deployed. For instance, a mobile device can be deployed in the operator compartment of harvester 100 for use in providing or implementing functionality discussed herein. FIGS. 16-17 are examples of handheld or mobile devices.

FIG. 15 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures described herein) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, contact or phone book application 43, client system 24, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 16 shows one example in which device 16 is a tablet computer 1100. In FIG. 16, computer 1100 is shown with user interface display screen 1102. Screen 1102 can be a touch screen or a pen-enabled interface that receives inputs from a pen or stylus. Tablet computer 1100, may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 17 is similar to FIG. 16 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 18:
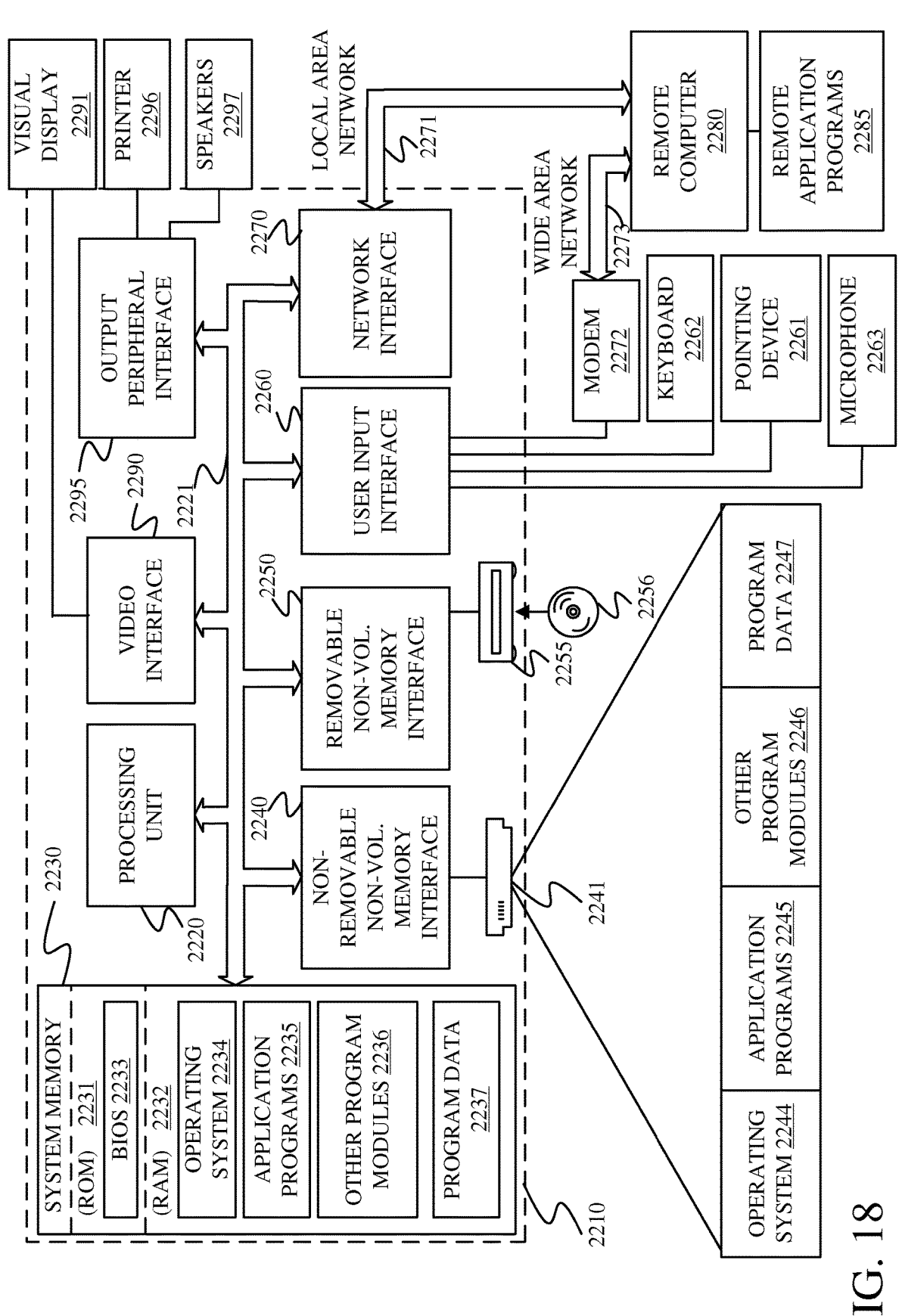
FIG. 18 is a block diagram showing one example of a computing environment that can be used in an agricultural harvesting system.

FIG. 18 is one example of a computing environment in which elements of previous figures described herein can be deployed. With reference to FIG. 18, an example system for implementing some embodiments includes a computing device in the form of a computer 2210 programmed to operate as discussed above. Components of computer 2210 may include, but are not limited to, a processing unit 2220 (which can comprise processors or servers from previous figures described herein), a system memory 2230, and a system bus 2221 that couples various system components including the system memory to the processing unit 2220. The system bus 2221 may be any of several types of bus structures including a memory bus or memory controller, a peripheral bus, and a local bus using any of a variety of bus architectures. Memory and programs described with respect to previous figures described herein can be deployed in corresponding portions of FIG. 18.

Computer 2210 typically includes a variety of computer readable media. Computer readable media may be any available media that can be accessed by computer 2210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 2210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 2230 includes computer storage media in the form of volatile and/or nonvolatile memory or both such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data or program modules or both that are immediately accessible to and/or presently being operated on by processing unit 2220. By way of example, and not limitation, FIG. 18 illustrates operating system 2234, application programs 2235, other program modules 2236, and program data 2237.

The computer 2210 may also include other removable/non-removable volatile/nonvolatile computer storage media. By way of example only, FIG. 18 illustrates a hard disk drive 2241 that reads from or writes to non-removable, nonvolatile magnetic media, an optical disk drive 2255, and nonvolatile optical disk 2256. The hard disk drive 2241 is typically connected to the system bus 2221 through a non-removable memory interface such as interface 2240, and optical disk drive 2255 are typically connected to the system bus 2221 by a removable memory interface, such as interface 2250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 18, provide storage of computer readable instructions, data structures, program modules and other data for the computer 2210. In FIG. 18, for example, hard disk drive 1241 is illustrated as storing operating system 2244, application programs 2245, other program modules 2246, and program data 2247. Note that these components can either be the same as or different from operating system 2234, application programs 2235, other program modules 2236, and program data 2237.

A user may enter commands and information into the computer 2210 through input devices such as a keyboard 2262, a microphone 2263, and a pointing device 2261, such as a mouse, trackball or touch pad. Other input devices (not shown) may include a joystick, game pad, satellite dish, scanner, or the like. These and other input devices are often connected to the processing unit 2220 through a user input interface 2260 that is coupled to the system bus, but may be connected by other interface and bus structures. A visual display 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 is operated in a networked environment using logical connections (such as a controller area network—CAN, local area network—LAN, or wide area network WAN) to one or more remote computers, such as a remote computer 2280.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. In a networked environment, program modules may be stored in a remote memory storage device. FIG. 18 illustrates, for example, that remote application programs 2285 can reside on remote computer 2280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. A mobile agricultural harvester comprising:
    one or more sensors configured to detect a grain processing quality characteristic and generate sensor data indicative of the detected grain processing quality characteristic;
    a display screen;
    one or more processors memory; and
    computer executable instructions, stored in the memory, and executable by the one or more processors, the computer executable instructions, when executed by the one or more processors, configuring the one or more processors to:
    define a limit of the grain processing quality characteristic;
    control one or more operating parameters, corresponding to the grain processing quality characteristic, of the mobile agricultural harvester based on limit;
    generate an interface on the display screen, the interface comprising:
        a limit interface display element indicative of the limit of the grain processing quality characteristic; and
        a characteristic value interface display element comprising a graph indicative of values of the grain processing quality characteristic over time.

2. The mobile agricultural harvester of claim 1, wherein the grain processing quality characteristic is one of grain loss, grain brokenness, or grain cleanliness.

3. The mobile agricultural harvester of claim 1, wherein the grain processing quality characteristic comprises a first grain processing quality characteristic, wherein the limit interface display element is a first limit display element indicative of a first limit of the first grain processing quality characteristic, wherein the characteristic value interface display element is a first characteristic value interface display element comprising a first graph indicative of values of the first grain processing quality characteristic over time, wherein the one or more sensors are configured to detect a second grain processing quality characteristic and generate sensor data indicative of the second grain processing quality characteristic and wherein the computer executable instructions, when executed by the one or more processors, further configure the one or more processors to:
    generate the interface, on the display screen, further comprising:
        a second limit interface display element indicative of a second limit of the second grain processing quality characteristic; and
        a second characteristic value interface display element comprising a second graph indicative of values of the second grain processing quality characteristic over time.

4. The mobile agricultural harvester of claim 3, wherein the one or more sensors are configured to detect a third grain processing quality characteristic and generate sensor data indicative of the third grain processing quality characteristic and wherein the computer executable instructions, when executed by the one or more processors, further configure the one or more processors to:
    generate the interface, on the display screen, further comprising:
        a third limit interface display element indicative of a third limit of the third grain processing quality characteristic; and
        a third characteristic value interface display element comprising a third graph indicative of values of the third grain processing quality characteristic over time.

5. The mobile agricultural harvester of claim 1, wherein the limit interface display element comprises a line incorporated into the graph, wherein the graph comprises an X axis comprising a time scale and a Y axis comprises a value scale corresponding to the grain processing quality characteristic, wherein the line is positioned at a location along the Y axis.

6. The mobile agricultural harvester of claim 5, wherein the graph further comprises a first graph display element comprising a first graph display element line and a first graph display element area that indicates a first proportion of the grain processing quality characteristic attributable to a first subsystem of the mobile agricultural harvester and a second graph display element comprising a second graph display element line and a second graph display element area that indicates a second proportion of the grain processing quality characteristic attributable to a second subsystem of the mobile agricultural harvester, wherein the first graph display element and the second graph display element are stacked.

7. The mobile agricultural harvester of claim 1, wherein the characteristic value interface display element comprises a first characteristic value interface display element and wherein the computer executable instructions, when executed by the one or more processors, further configure the one or more processors to:

generate the interface further comprising:

a second characteristic value interface display element, separate from the first characteristic value interface display element and indicative of a current value of the grain processing quality characteristic.

8. The mobile agricultural harvester of claim 1, wherein the computer executable instructions, when executed by the one or more processors, further configure the one or more processors to:

generate the interface further comprising:

a limit adjuster interface display element that is interactable to provide for adjustment of the limit of the grain processing quality characteristic; and upon interaction with the limit adjuster interface display element, generate a limit adjuster interface comprising an interactable adjustment interface display element that is interactable to adjust the limit of the grain processing quality characteristic.

9. The mobile agricultural harvester of claim 1, wherein the computer executable instructions, when executed by the one or more processors, further configure the one or more processors to:

generate the interface further comprising:

a productivity display portion comprising a productivity interface display element indicative of a value of a productivity characteristic.

10. The mobile agricultural harvester of claim 1, wherein the computer executable instructions, when executed by the one or more processors, further configure the one or more processors to:

generate the interface further comprising:

a productivity display portion comprising a productivity interface display element comprising a productivity graph indicative of values of a first productivity characteristic over time and indicative of values of a second productivity characteristic over time;

wherein the productivity graph comprises an X axis comprising a time scale, a first Y axis comprising a first value scale corresponding to the first productivity characteristic, a second Y axis comprising a second value scale corresponding to the second productivity characteristic, a first line indicative of values of the first productivity characteristic across the time scale, and a second line indicative of values of the second productivity characteristic over the time scale.

11. The mobile agricultural harvester of claim 1, wherein the computer executable instructions, when executed by the one or more processors, configure the one or more processors to:

determine that the grain processing quality characteristic fails to satisfy the limit;

determine an adjustment to the one or more operating parameters to satisfy the limit; and control the one or more operating parameters based on the determined adjustment.

12. A computer implemented method comprising:

obtaining sensor data, from one or more sensors, indicative of a grain processing quality characteristic detected by the one or more sensors;

generating, on a display screen, an interface comprising:

a limit interface display element indicative of a limit of the grain processing quality characteristic;

a limit adjust interface display element; and a characteristic value interface display element comprising a graph indicative of values of the grain processing quality characteristic over time;

detecting user interaction with the limit adjust interface display element of the interface; and in response to the user interaction with the limit adjust interface display element, adjusting the limit of the grain processing quality characteristic.

13. The computer implemented method of claim 12, wherein obtaining sensor data, from one or more sensors, indicative of the grain processing quality characteristic comprises obtaining sensor data, from one or more sensors, indicative of a first grain processing quality characteristic and a second grain processing quality characteristic;

wherein generating, on the display screen, the interface comprises generating, on the display screen, the interface comprising:

a first limit display element indicative of a first limit of the first grain processing quality characteristic;

a first characteristic value interface display element comprising a first graph indicative of values of the first grain processing quality characteristic over time;

a second limit interface display element indicative of a second limit of the second grain processing quality characteristic; and a second characteristic value interface display element comprising a second graph indicative of values of the second grain processing quality characteristic over time.

14. The computer implemented method of claim 12, wherein obtaining sensor data from one or more sensors indicative of the grain processing quality characteristic comprises obtaining sensor data, from one or more sensors, indicative of a first grain processing quality characteristic, a second grain processing quality characteristic, and a third grain processing quality characteristic:

wherein generating, on the display screen, the interface comprises generating, on the display screen, the interface comprising:

a first limit display element indicative of a first limit of the first grain processing quality characteristic;

a first characteristic value interface display element comprising a first graph indicative of values of the first grain processing quality characteristic over time;

a second limit display element indicative of a second limit of the second grain processing quality characteristic;

a second characteristic value interface display element comprising a second graph indicative of values of the second grain processing quality characteristic over time;

a third limit interface display element indicative of a third limit of the third grain processing quality characteristic; and a third characteristic value interface display element comprising a third graph indicative of values of the third grain processing quality characteristic over time.

15. The computer implemented method of claim 14, wherein generating, on the display screen, the interface comprises generating, on the display screen, the interface further comprising:

a fourth characteristic value interface display element next to the first characteristic value interface display element, the fourth characteristic value interface display element indicative of a current value of the first characteristic;

a fifth characteristic value interface display element next to the second characteristic value interface display element, the fifth characteristic value interface display element indicative of a current value of the second characteristic; and a sixth characteristic value interface display element next to the third characteristic value interface display element, the sixth characteristic value interface display element indicative of a current value of the third characteristic.

16. The computer implemented method of claim 12, wherein the graph comprises an X axis comprising a time scale and a Y axis comprising a value scale corresponding to the grain processing quality characteristic;

wherein the limit interface display element comprises a line incorporated into the graph and disposed at a position along the Y axis.

17. The computer implement method of claim 16, wherein generating, on the display screen, the interface comprises generating, on the display screen, the computer implemented method further comprising:

receiving interaction with the limit adjuster interface display element to adjust the limit of the grain processing quality characteristic;

generating, on the display screen, an updated interface comprising:

an updated characteristic value interface display element comprising the graph comprising the X axis and an updated Y axis comprising a rescaled value scale corresponding to the grain processing quality characteristic based on adjustment of the limit of the grain processing quality characteristic, the line incorporated into the graph and disposed at the position along the updated Y axis.

18. The computer implemented method of claim 12, wherein generating, on the display screen, the interface comprises generating, on the display screen, the interface further comprising:

a productivity display portion comprising a productivity interface display element comprising a productivity graph that indicates the values of one or more productivity characteristics over time.

19. The computer implemented method of claim 12 and further comprising:

generating a control signal to control a controllable subsystem of an agricultural harvester based on the limit of the grain processing quality characteristic and a value of the grain processing quality characteristic.

20. An agricultural harvesting system comprising:

one or more sensors configured to detect a first grain processing quality characteristic and a second grain processing quality characteristic and generate sensor data indicative of the detected first grain processing quality characteristic and the detected second grain processing quality characteristic;

a display screen;

one or more processors memory; and computer executable instructions, stored in the memory, and executable by the one or more processors, the computer executable instructions, when executed by the one or more processors, configure the one or more processors to:

generate an interface comprising:

a first limit interface display element indicative of a first limit of the first grain processing quality characteristic;

a second limit interface display element indicative of a second limit of the second grain processing quality characteristic;

a first characteristic value interface display element comprising a first graph indicative of values of the first grain processing quality characteristic over time; and a second characteristic value interface display element comprising a second graph indicative of values of the second grain processing quality characteristic over time;

display the interface on the display screen; and control one or more operating parameters that affect at least one of the first grain processing quality characteristic or the first grain processing quality characteristic based on at least one of the first limit or the second limit.

* * * * *